(12) United States Patent
McCaw

(10) Patent No.: US 10,630,157 B2
(45) Date of Patent: Apr. 21, 2020

(54) AXIAL FLUX MACHINE

(71) Applicant: YASA LIMITED, Yarnton, Oxfordshire (GB)

(72) Inventor: Christopher Thomas McCaw, Oxfordshire (GB)

(73) Assignee: YASA LIMITED, Oxfordshire (GB)

( * ) Notice: Subject to any disclaimer, the term of this patent is extended or adjusted under 35 U.S.C. 154(b) by 0 days.

(21) Appl. No.: 15/574,990

(22) PCT Filed: May 11, 2016

(86) PCT No.: PCT/GB2016/051349
§ 371 (c)(1),
(2) Date: Nov. 17, 2017

(87) PCT Pub. No.: WO2016/185173
PCT Pub. Date: Nov. 24, 2016

(65) Prior Publication Data
US 2018/0145574 A1    May 24, 2018

(30) Foreign Application Priority Data
May 19, 2015   (GB) .................................. 1508595.4

(51) Int. Cl.
*H02K 9/06* (2006.01)
*H02K 21/24* (2006.01)
(Continued)

(52) U.S. Cl.
CPC ............... *H02K 21/24* (2013.01); *H02K 5/20* (2013.01); *H02K 9/06* (2013.01); *H02K 9/18* (2013.01); *H02K 2213/12* (2013.01)

(58) Field of Classification Search
CPC ...... H02K 49/046; H02K 9/06; H02K 1/2793; H02K 1/32; H02K 5/18; H02K 5/20
See application file for complete search history.

(56) References Cited

U.S. PATENT DOCUMENTS 3,553,507 A * 1/1971 Bessiere .................... B60J 3/02
310/268
5,652,470 A * 7/1997 von der Heide ....... H02K 21/22
310/156.05
(Continued)

FOREIGN PATENT DOCUMENTS

DE    4214483 A1   11/1993
EP    2251962 A2   11/2010
(Continued)

OTHER PUBLICATIONS

International Search Report and Written Opinion dated Aug. 25, 2016, from International Application No. PCT/GB2016/051349, 16 pages.

(Continued)

*Primary Examiner* — Dang D Le
(74) *Attorney, Agent, or Firm* — Meunieer Carlin & Curfman LLC

(57) ABSTRACT

An axial flux machine (100) is provided, in which the rotor (104) is cooled via air cooling, provided by impeller blades (140) located on the opposite side of the rotor (104) to the stator (102). An impeller cover (142) covers the impeller blades (140) such that air channels are defined between adjacent blades. The air channels have an air inlet (146) at an inner radial portion of the rotor (104), and an air outlet (146) at the outer radial extremity of the impeller blades (140). As the rotor (104) turns, the air is drawn through the air channel from the air inlet (144) to the air outlet (146). The motor (100) may be enclosed within a housing (120), in which case air ducting (150,152) may be used to guide air to the air inlet (144), and from the air outlet (146) to the outside of the housing (120).

21 Claims, 15 Drawing Sheets

(51) Int. Cl.
*H02K 5/20* (2006.01)
*H02K 9/18* (2006.01)

(56) References Cited

U.S. PATENT DOCUMENTS

| | | | | |
|---|---|---|---|---|
| 5,892,307 A * | 4/1999 | Pavlovich | ................ | H02K 1/32 |
| | | | | 310/156.36 |
| 6,209,692 B1 * | 4/2001 | Pels | ..................... | B60K 6/485 |
| | | | | 188/381 |
| 6,450,781 B1 * | 9/2002 | Petrovich | ................ | F04D 25/16 |
| | | | | 310/55 |
| 2002/0047451 A1 * | 4/2002 | Weimer | .................. | H02K 3/28 |
| | | | | 310/184 |
| 2008/0277094 A1 | 11/2008 | Peng et al. | | |

FOREIGN PATENT DOCUMENTS

| | | | |
|---|---|---|---|
| GB | 2468018 A | 8/2010 | |
| GB | 2482928 A | 2/2012 | |
| WO | 2014/192121 A1 | 12/2014 | |

OTHER PUBLICATIONS

Search Report under Section 17(5) dated Dec. 4, 2015, from GB Application No. GB1508595.4, 3 pages.

* cited by examiner

AXIAL FLUX MACHINE

FIELD OF THE INVENTION

The present invention relates to axial flux machines.

BACKGROUND OF THE INVENTION

In the present invention, we are concerned with axial flux permanent magnet machines. Broadly speaking these have disc- or ring-shaped rotor and stator structures arranged about an axis. Typically the stator comprises a set of coils each parallel to the axis and the rotor bears a set of permanent magnets and is mounted on a bearing so that it can rotate about the axis driven by fields from the stator coils. FIG. 1a shows the general configuration of an axial flux machine of the present invention with a pair of rotors R1, R2 to either side of a stator S—although a simple structure of the present invention could omit one of the rotors. As can be seen there is an air gap G between a rotor and a stator and in an axial flux machine the direction of flux through the air gap is substantially axial.

There are various configurations of axial flux permanent magnet machine depending upon the arrangement of north and south poles on the rotors. FIG. 1b illustrates the basic configurations of a Torus NS machine, a Torus NN machine (which has a thicker yoke because the NN pole arrangement requires flux to flow through the thickness of the yoke), and a YASA (Yokeless and Segmented Armature) topology. The illustration of the YASA, so called "Y" machine topology shows cross-sections through two coils, the cross-hatched area showing the windings around each coil. As can be appreciated, dispensing with the stator yoke provides a substantial saving in weight and iron losses, but impacts on the ability to extract heat from the machine.

One difficulty with electric machines generally is to provide adequate cooling. This is a particular problem with a Y machine having a high torque density because significant heat is generated in the coils at high torques and is often a limiting factor in the torques that can be employed, at least for extended periods of time. The problem with cooling the stator in such a machine was addressed in our previous application GB2468018. However, with axial flux machines, eddy currents in the magnets and rotor structure (housing the magnets) may cause the rotor and the magnets to heat up. Whilst cooling the stator also cools the rotor to some extent (through heat being transferred by a hub or bearing assembly, for example, between the rotor and stator), there still may remain a significant amount of heat in the rotors, which will adversely affect the performance of the machine, since the properties of the magnets deteriorate as their temperature increases.

Some solutions have been proposed in which air channels are created in the surface of the magnets, between magnets, or blades are placed at the ends of rotors in order to move air around the magnets and rotor for air cooling the rotor. In some machines, fan blades are placed on the rotor in order to move air around when the rotor is turning. Examples include JP2009022146, EP2843812 and DE4214483. However, often these solutions impact on the design of the machine, for example, by increasing the axial length of the machine, which is not desirable. Furthermore, due to tolerances in the design and manufacture of the machines, the cooling performance of such fans and structures varies from machine to machine, which is undesirable. For some applications radial motors are cooled by way of a fan attached to the motor shaft and which because of the radial structure is able to pass air over the gap between stator and rotor and thereby cool both components. Such a configuration is not feasible with an axial flux motor.

We have therefore appreciated the need for an improved axial flux machine in which the rotor is cooled more reliably.

SUMMARY OF THE INVENTION

The present invention therefore provides an axial flux machine comprising: a stator comprising a stator housing enclosing a plurality of stator bars disposed circumferentially at intervals around an axis of the machine, each of the stator bars having a set of coils wound therearound for generating a magnetic field; a rotor comprising a set of permanent magnets on a first side of the rotor facing the stator, the rotor being mounted for rotation about the axis of the machine and relative to the stator, the rotor being spaced apart from the stator along the axis of the machine to define an axial gap between the stator and rotor and in which magnetic flux in the machine is generally in an axial direction; a plurality of impellor blades projecting axially from a second side of the rotor, and extending radially along at least a portion of the second side of the rotor, the second side of the rotor facing away from the stator; and an impellor cover covering the plurality of impellor blades to define a plurality of covered air channels between each adjacent pair of impellor blades, each air channel having an air inlet at an inner radial end of the impellor blades, and each air channel having an air outlet at an outer radial extremity of the impellor blades, wherein the impellor blades are configured to move air through the plurality of air channels from the air inlet to the air outlet when the rotor turns, to cool the rotor.

By using the impellor blades and impellor cover, an efficient air cooling mechanism may be provided to the rotor of the machine, which enables the rotor to work harder for longer: heat generated by eddy-currents in the magnets and back-iron is transferred to the air meaning the rotor runs cooler for a given speed/torque requirement.

The machine may comprise a housing enclosing the rotor. The machine housing may enclose the stator. The machine housing may comprise an outlet duct for receiving expelled air from the air outlets and passing the expelled air out of the machine housing. The machine housing may also comprise an inlet duct for directing air from outside of the machine housing to the air inlets. The use of ducting in the housing provides means for getting the hot air away from the machine, and getting cooler air into the machine. The inlet duct may comprise, or may be coupled to, an air filter.

The machine may comprise a second rotor disposed on an opposite side of the stator to the first rotor, the second rotor comprising a set of permanent magnets on a first side of the second rotor facing the stator, the second rotor being mounted for rotation about the axis of the machine and relative to the stator, the second rotor being spaced apart from the stator along the axis of the machine to define an axial gap between the stator and second rotor and in which magnetic flux in the machine is generally in an axial direction.

In such an arrangement, the machine may comprise a hub bearing assembly between the rotors and stator to permit relative rotation between the rotors and stator. The hub bearing assembly may couple the first and second rotors together such that they are rotatable together.

Alternatively, the first rotor is mounted to the hub bearing assembly and the second rotor is mounted only to the first rotor, the first and second rotors forming a U-shaped cupped enclosure extending either side of the stator.

In the machine comprising first and second rotors, the machine may comprise: a second plurality of impellor blades projecting axially from a second side of the second rotor, and extending radially along at least a portion of the second side of the second rotor, the second side of the second rotor facing away from the stator; and a second impellor cover covering the second plurality of impellor blades to define a plurality of covered air channels between each adjacent pair of impellor blades, each air channel having an air inlet at an inner radial end of the impellor blades, and each air channel having an air outlet at an outer radial extremity of the impellor blades, wherein the impellor blades are configured to move air through the plurality of air channels from the air inlet to the air outlet when the rotor turns, to cool the rotor.

In the machine comprising first and second rotors, the machine may comprise a machine housing enclosing the second rotor, where the machine housing may comprise a second outlet duct for receiving expelled air from the air outlets of the second plurality of impellor blades, and passing the expelled air out of the machine housing. The machine housing may comprise an inlet duct for directing air from outside of the machine housing to the air inlets of the second plurality of impellor blades.

In any of the above machines, the impellor blades may be shaped so as to move air between the air inlet and air outlet when the rotor rotates in a clockwise direction. The impellor blades may be shaped so as to move air between the air inlet and air outlet when the rotor rotates in an anti-clockwise direction. Alternatively, the impellor blades may be shaped and configured to move air between the air inlet and air outlet when the rotor rotates in either a clockwise or anti-clockwise direction.

In any of the above machines, the stator housing defines a chamber incorporating cooling medium in contact with the coils to cool the coils, the stator housing including a port for supply and a port for drainage of the cooling medium. The port for supply and port for drainage may be coupled to a heat exchanger, and wherein air from the air outlet is directed through the heat exchanger such that heat is transferred from the air into the cooling medium.

The air directed through the heat exchanger may be directed towards the air inlet after passing through the heat exchanger.

The port for supply and the port for drainage of the cooling medium may form part of a cooling circuit comprising a pump and a radiator, the radiator for extracting heat from the cooling medium.

The axial flux machine may be located in an enclosure. When located in an enclosure, the radiator may be located outside of the enclosure.

In any of the above machines, the impellor cover comprises an annulus. The impellor cover may also comprise a rotary position sensor trigger for a rotary position sensor.

In any of the above machines, the machine may be a motor or generator.

LIST OF FIGURES

The present invention will now be described, by way of example only, and with reference to the accompanying figures, in which.

DETAILED DESCRIPTION OF THE PREFERRED EMBODIMENTS

Figure 1A:
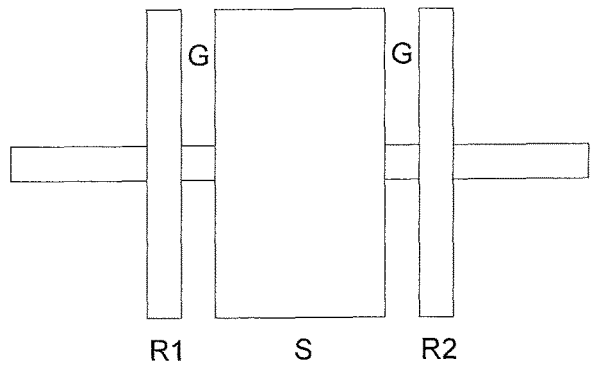
FIGS. 1a to 1c show, respectively, a general configuration of a two-rotor axial flux machine, example topologies for axial flux permanent magnet machines, and a schematic side view of a yokeless and segmented armature (YASA) machine.
Figure 1B:
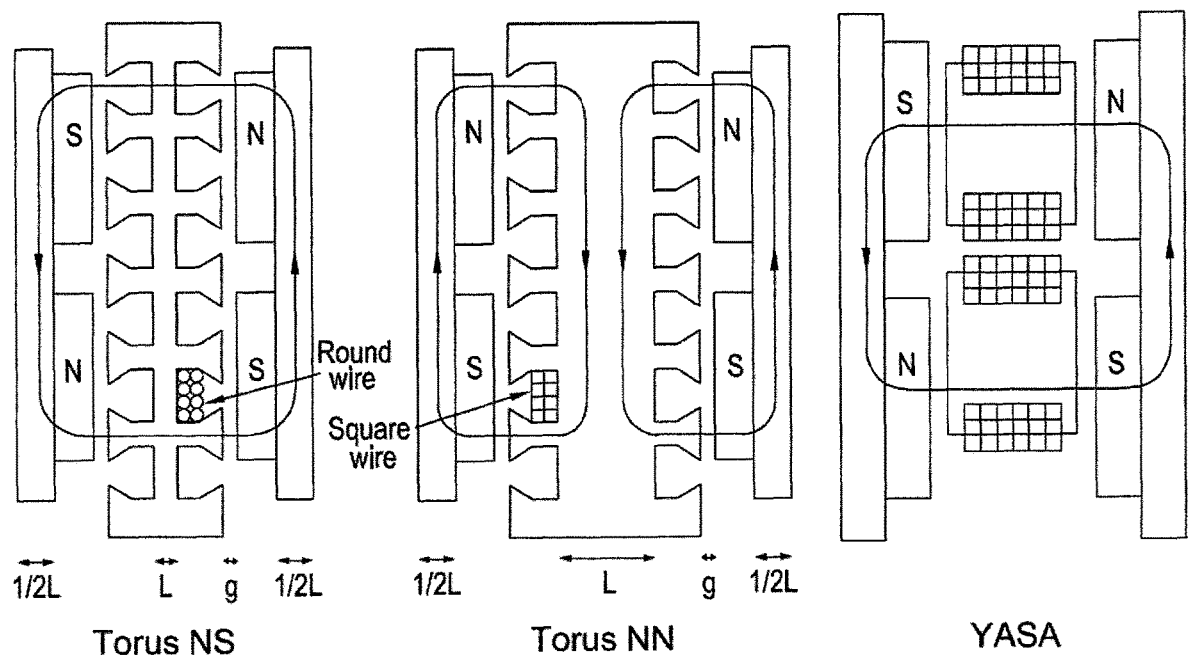
Figure 1C:
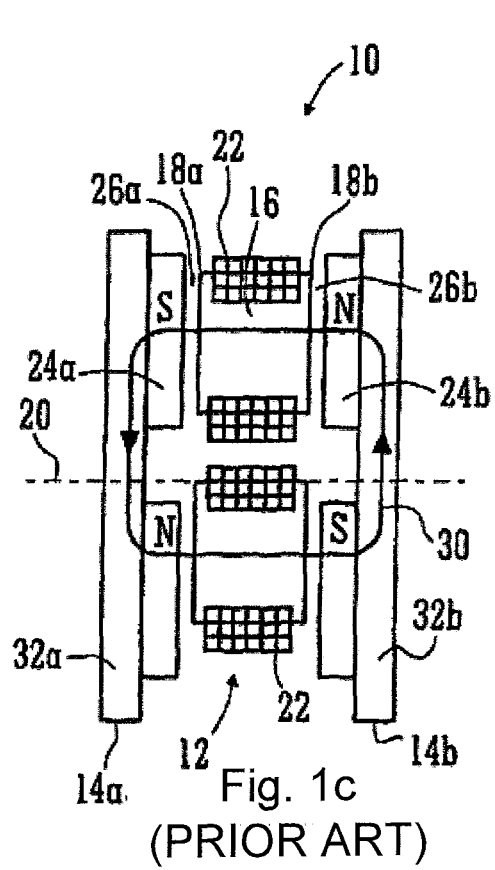
Figure 2:
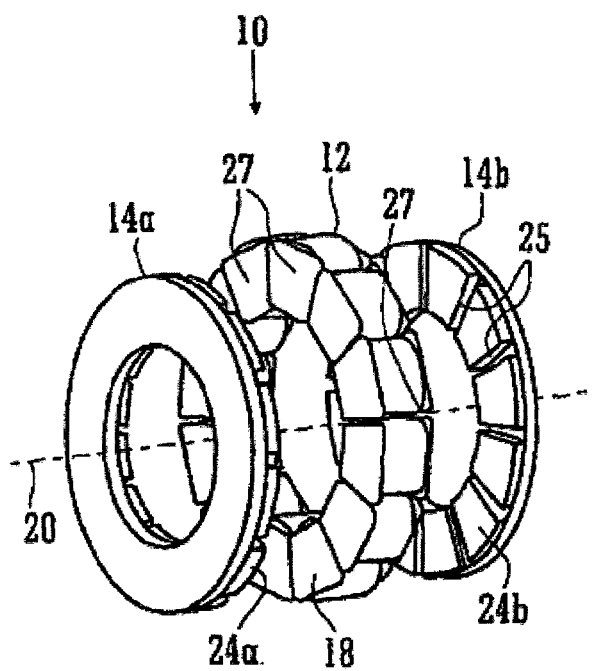
FIG. 2 shows a perspective view of the YASA machine of FIG. 1c.
Figure 3:
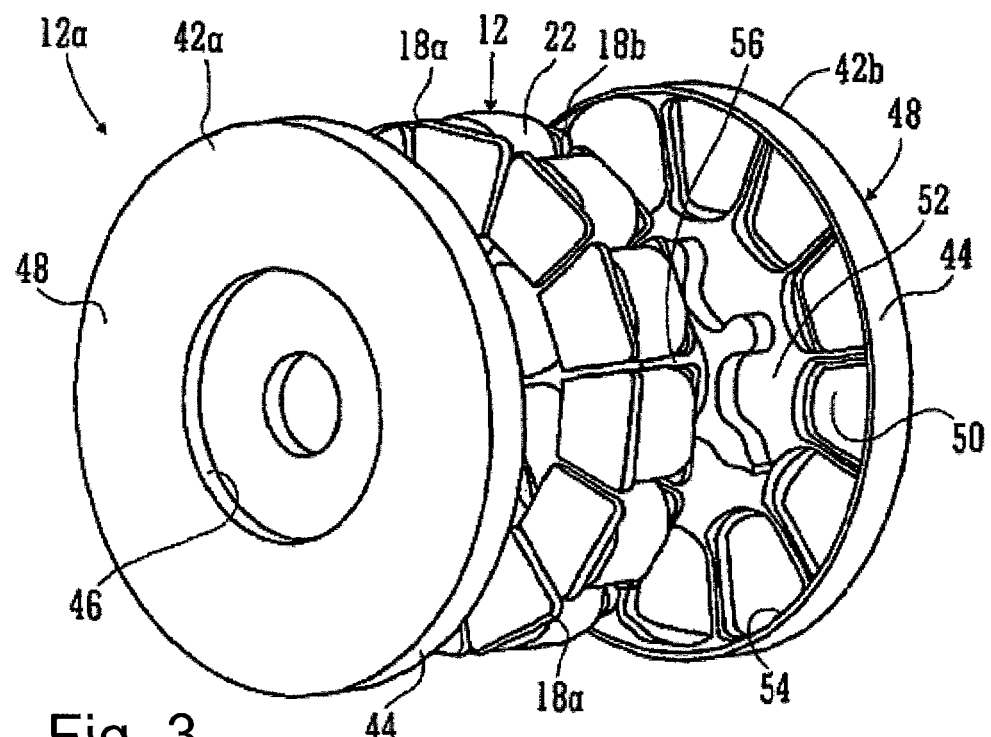
FIG. 3 shows a perspective exploded view of a stator and stator housing for a YASA machine.

Referring first to FIGS. 1c, 2 and 3, which are taken from our PCT application WO2012/022974, FIG. 1c shows a schematic illustration of a yokeless and segmented armature machine 10.

The machine 10 comprises a stator 12 and two rotors 14a,b. The stator 12 is a collection of separate stator bars 16 spaced circumferentially about a rotation axis 20 of the rotors 14a,b. Each bar 16 has its own axis (not shown) which is preferably, but not essentially, disposed parallel to the rotation axis 20. Each end of each stator bar is provided with a shoe 18a,b which serves a physical purpose of confining a coil stack 22, which stack 22 is preferably of square/rectangular section insulated wire so that a high fill factor can be achieved. The coils 22 are connected to an electrical circuit (not shown) that, in the case of a motor, energizes the coils so that the poles of the resultant magnetic fields generated by the current flowing in the coils is opposite in adjacent stator coils 22.

The two rotors 14a,b carry permanent magnets 24a, b that face one another with the stator coil 22 between (when the stator bars are inclined—not as shown—the magnets are likewise). Two air gaps 26a,b are disposed between respective shoe and magnet pairs 18a/24a, 18b/24b. There are an even number of coils and magnets spaced around the axis of rotation 20 and, preferably, there are a different number of coils and magnets so that the coils do not all come into registration with the corresponding magnet pair at the same time and at the same rotational position of the rotor with respect to the stator. This serves to reduce cogging.

In a motor the coils 22 are energized so that their polarity alternates serving to cause coils at different times to align with different magnet pairs, resulting in torque being applied between the rotor and the stator. The rotors 14*a,b* are generally connected together (for example by a shaft, not shown) and rotate together about the axis 20 relative to the stator 12. The magnetic circuit 30 is provided by two adjacent stator bars 16 and two magnet pairs 24*a,b* and a back iron 32*a,b* for each rotor links the flux between the back of each magnet 24*a,b* facing away from the respective coils 22. The stator coils 16 are enclosed within a housing that extends through the air gap 26*a, b* and which defines a chamber supplied with a cooling medium.

Turning to FIG. 3, a stator 12*a* is shown in which the stator coils are located between plastic material clam shells 42*a, b*. These clamshells have external cylindrical walls 44, internal cylindrical walls 46, and annular radially disposed walls 48. In the prior art example of FIG. 3 the radial walls 48 include internal pockets 50 to receive the shoes 18*a,b* of the stator bars 16 and serve to locate the stator coil assemblies 16, 22, 18*a,b* when the two clam shell housings 42*a, b* of the stator 12*a* are assembled together. The stator housing 42*a, b* defines spaces 52 internally of the coils 22 and externally at 54 around the outside of the coils 22 and there are spaces 56 between the coils. The spaces 52,54,56 are interlinked defining a cooling chamber. Although not shown in FIG. 3, when assembled, the stator housing 42*a,b* is provided with ports that allow cooling medium such as oil to be pumped into the spaces 52,54,56 to circulate around the coils and cool them.

The coil cores may be laminated with the inter-lamination insulation parallel to the desired flux direction. However the coil cores may also be formed from soft-iron particles coated with electrical insulation and moulded to a desired shape (soft magnetic composites—SMC), being bound together by the insulation matrix. An example SMC may comprise glass-bonded iron particles, a thin layer (typically <10 µm) of glass bonding and mutually electrically insulating the iron particles, leaving some residual porosity. A high-temperature, high-pressure compaction process is used to mould the component into a complex shape, capable of producing three-dimensional magnetic flux patterns with an excellent form factor and enabling a high fill factor winding to be employed, wound straight onto SMC teeth. Conveniently the shoes and stator bar may be formed separately and subsequently assembled; a shoe may have a central region with an axial direction of minimum reluctance and an outer region with a radial direction of minimum reluctance (see WO2012/022974).

Turning to the invention, in brief, the axial flux machine rotor is cooled via air cooling, provided by impellor blades located on the opposite side of the rotor to the stator. An impellor cover covers the impellor blades such that air channels are defined between adjacent blades. The air channels have an inlet at an inner radial portion of the rotor, and an air outlet at the outer radial extremity of the impellor blades. As the rotor turns, the air is drawn through the air channel by virtue of the low pressure region present at the air inlet caused by the air being expelled out of the outlet. The rotor may be enclosed within an enclosure, in which case air ducting may be used to guide air to the air inlet, and also from the air outlet to the outside of the enclosure.

FIGS. 4 to 8 show a first version of the axial flux machine according to the present invention. Whilst these figures show an axial flux machine having two rotors either side of a stator, it is envisaged that the present invention is also applicable to axial flux machines having only one rotor disposed on one side of the stator.

The axial flux machine 100 comprises a stator 102 and a rotor 104, which has two stages 104*a, b*, disposed either side of the stator 102 and spaced apart from the stator.

A hub assembly 106 is provided between the stator and rotor. The hub assembly 106 comprises a rotating hub and a mount separated by a bearing 116, so that the hub can rotate relative to the mount. The stator 102 is mounted to the hub assembly 106 via the bearings 116.

The first rotor 104*a* mounts on the hub assembly and the second rotor 104*b* mounts to the first rotor 104*a* via the hub assembly such that the first and second rotors rotate in unison, and relative to the stator. The rotors 104*a,b* have radial walls mounting a set of permanent magnets 118*a,b*. Either or both of rotors 104*a,b* provide a drive input/output, in the case of a generator/motor respectively, but for simplicity this is not shown in the figures.

The stator 102 has a housing 120 comprising first and second radial walls 122,124 and generally cylindrical inner and outer walls 126,128, defining a chamber within which coolant may circulate. The housing encloses a set of stator coils; these and their electrical connections are not shown for simplicity. The coils are wound around pole pieces (not shown).

A plurality of impellor blades 140 are disposed on a surface of the first rotor 104*a*, opposite to the surface facing the stator 102. The impellor blades project from the surface of the rotor 104*a* axially, and extend generally radially with respect to the axis of rotation of the rotor. The impellor blades are covered by an impellor cover 142, which may be in the shape of an annulus.

The placement of the impellor cover 142 over the impellor blades 140 creates a plurality of air channels, each located between adjacent pairs of rotor blades. Each air channel has an air inlet 144 located at an inner radial end of the impellor blades 140, and each air channel has an air outlet 146 at an outer radial extremity of the impellor blades 140. As the rotor 104*a* rotates, the impellor blades 140 are configured to move air through the plurality of air channels from the air inlet 144 to the air outlet 146. As the air passes over the back surface of the rotor (which forms part of the air channels), heat is transferred from the rotor 104*a* surface into the air, which exits through the air outlet 146 and thus cools the rotor.

The air flow caused by rotation of the rotor 104*a* and impellor blades 140 generates a pressure differential along the air channel. A lower air pressure is created at the air inlet, which causes more air to be drawn into and through the air channel.

As can be seen, the impellor blades 140 and impellor cover 142 form an enclosed impellor design, rather than an open impellor design. A closed impellor design provides more consistent fan performance from machine to machine, since the dimensions of air channels are fixed, and are not reliant on tolerances of several components in the axial dimension (e.g. the axial distance between the impellor blades and a machine cover, which can vary depending on the tolerancing of various components in that axis).

The impellor blades 140 and/or impellor cover 142 are preferably made of metal. Since they have relatively large surface areas (they may cover the majority of the surface of the back of the rotor 104*a*), they provide a great means for heat removal. The blades 140 and cover 142 also provide additional rigidity to the rotor 104*a*.

Furthermore, this closed fan design generates turbulent flow, since there is an increase in air velocity for a given pressure differential, which increases the likelihood of breaching the Reynolds number of 2000. Turbulent air greatly improves the efficiency of the heat transfer between the rotor surface and the air passing through the air channels. It also may overcome back-pressure of the air inlet system, which may include an inlet filter and ducting bringing "cool" air in from beyond the immediate environment.

In order to minimise the impact of the additional cooling features on the axial length of the machine, the impellor blades may be provided only on the first rotor 104a, as shown in FIGS. 4 to 8. In this situation, the second rotor 104b (if there is one) is cooled by thermal transfer through the machine's hub 106 (denoted by black dotted line running through the hub 106).

By providing the impellors 140 and impellor cover 142, effective cooling is provided to the rotors, which enables the rotor 104a,b to work harder for longer: heat generated by eddy-currents in the magnets and back-iron is transferred to the air meaning the rotor runs cooler for a given speed/torque requirement.

Figure 4:
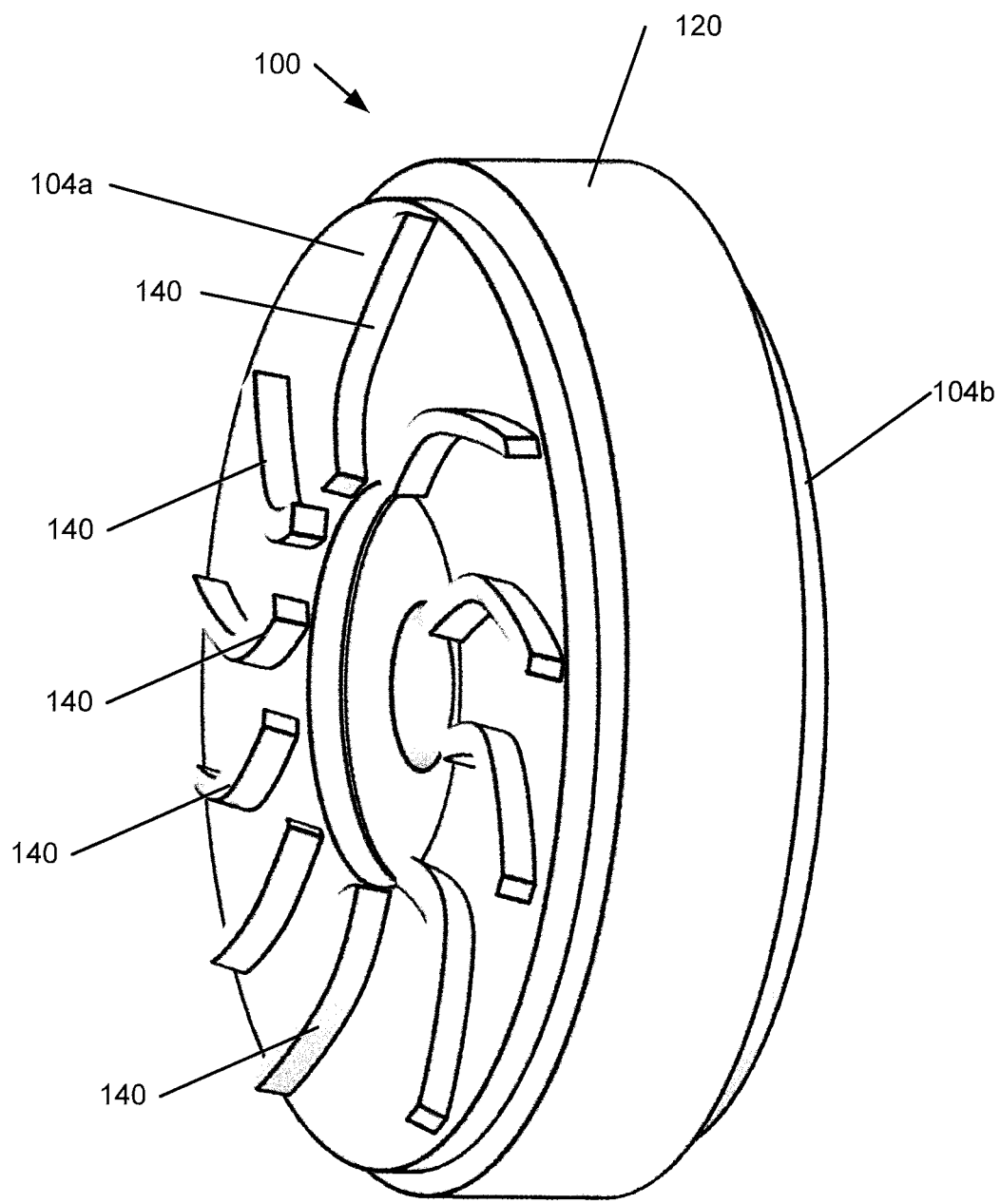
FIG. 4 shows portions of a machine according to the present invention.
Figure 5:
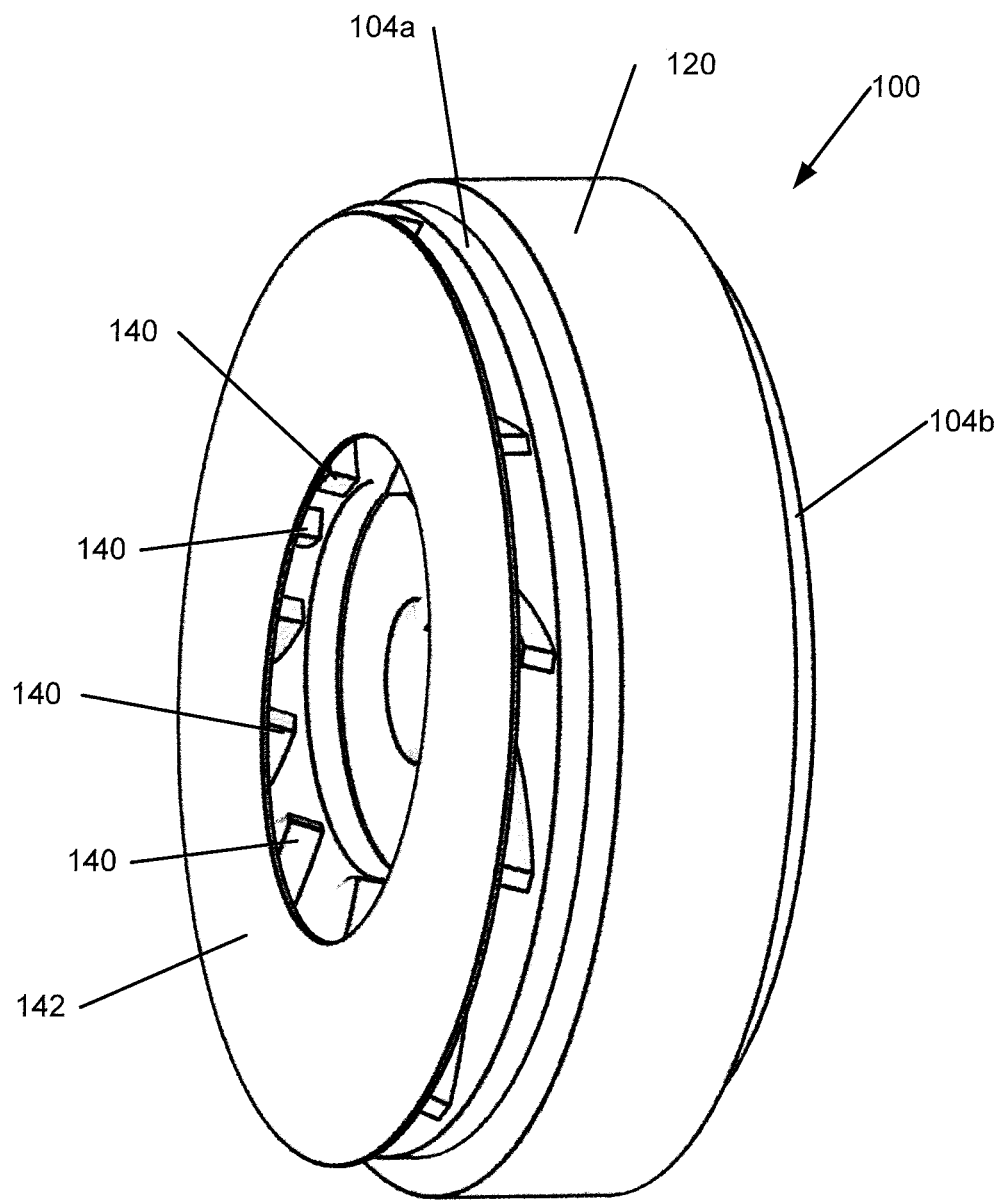
FIG. 5 shows the machine of FIG. 4 with an impellor cover.
Figure 6:
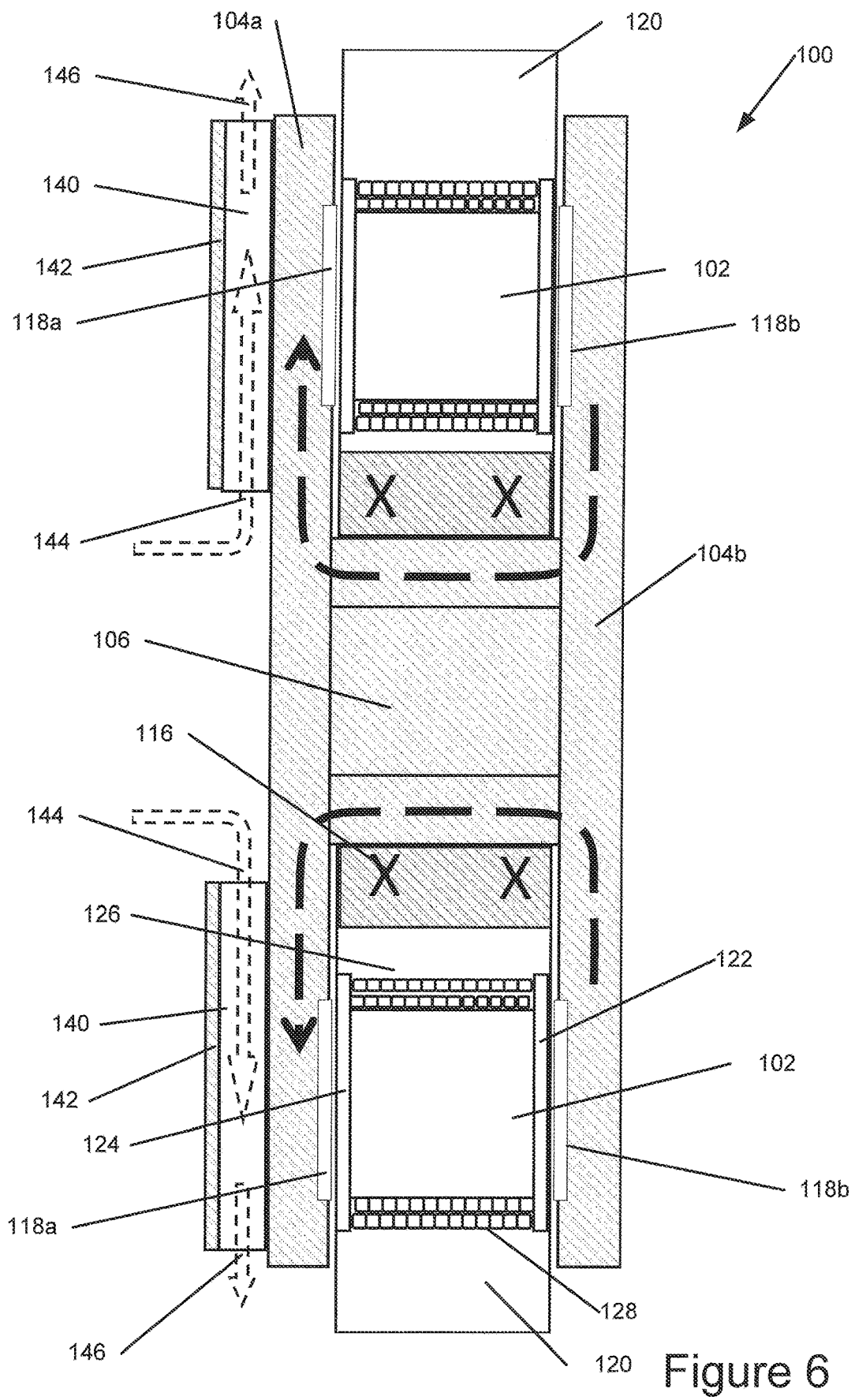
FIG. 6 shows a cut-through view of the machine of FIG. 5.
Figure 7:
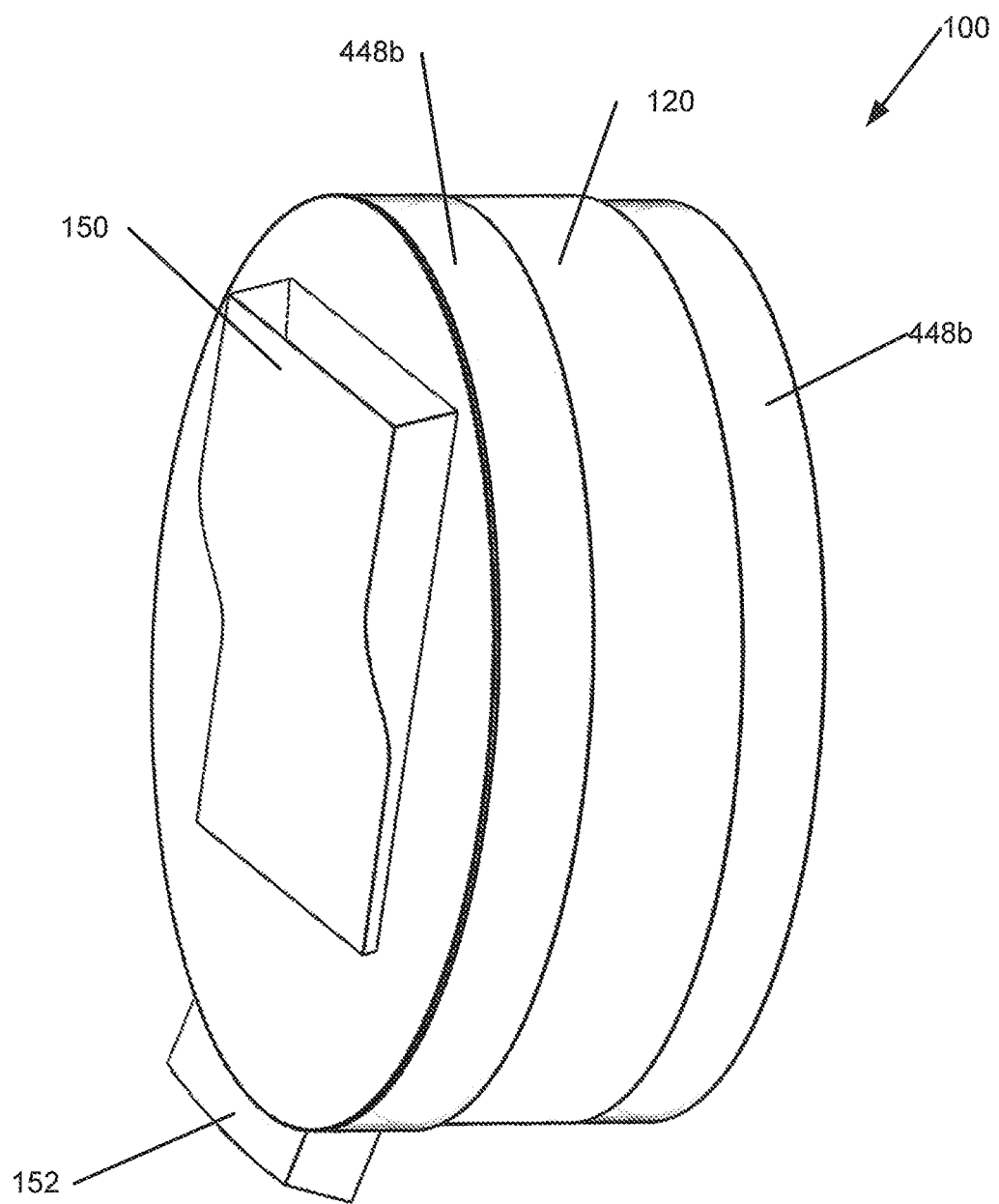
FIG. 7 shows the machine of FIG. 5 with a machine housing.
Figure 8:
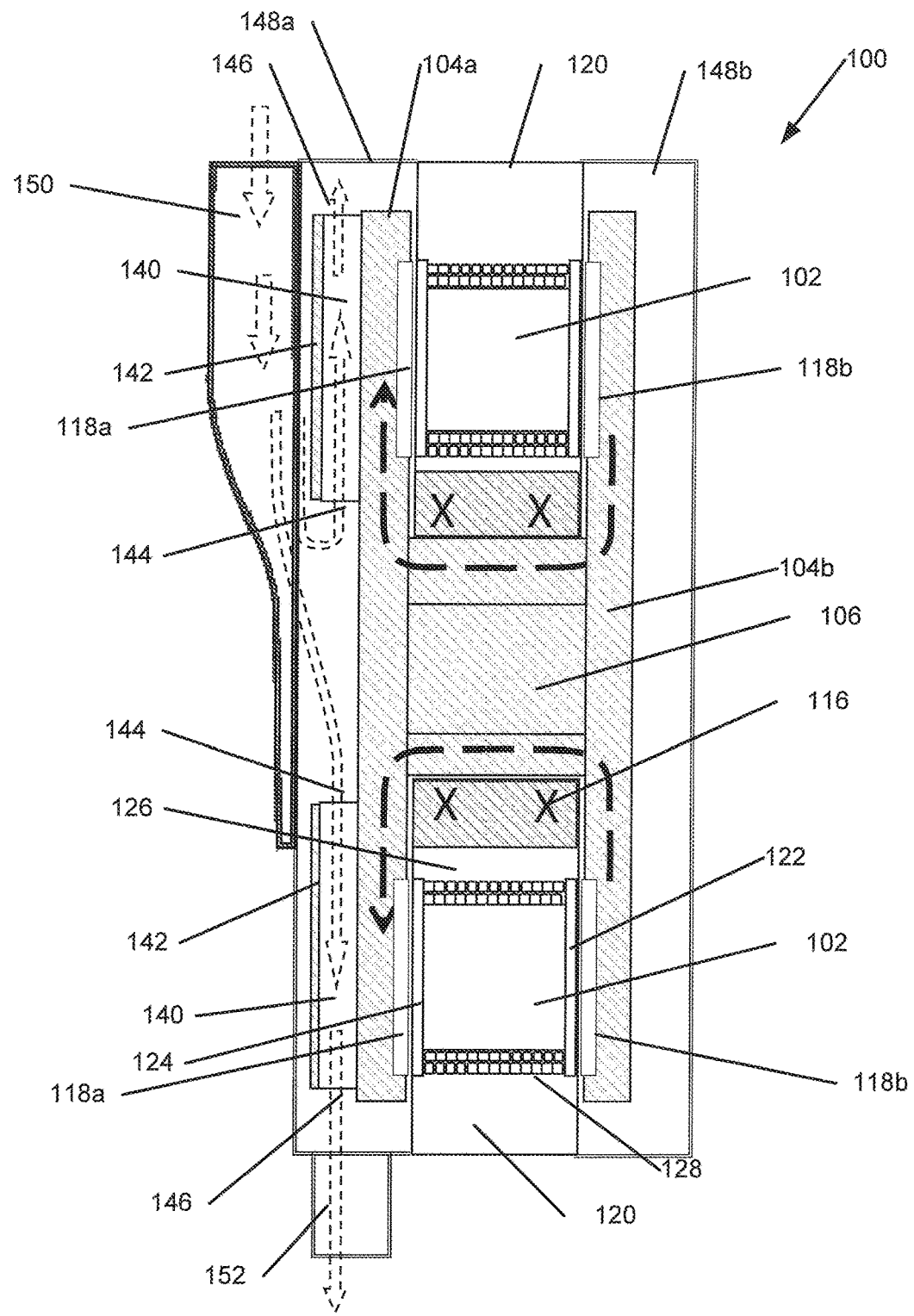
FIG. 8 shows a cut-through view of the machine of FIG. 7.

FIGS. 7 and 8 show the machine of FIGS. 4 to 6 with a machine housing 148, an inlet duct 150 and an outlet duct 152. The air inlet duct 150 provides air to the air inlet 144, and the air outlet 152 receives output air from the air outlet 146. The operation of this version of the machine is the same as that of FIGS. 4 to 6, however in this instance, the rotors 104a,b are covered by machine covers 148a,b, which protect the rotors from the sometimes harsh external environment, and also protect users from open rotating rotors.

In this case, an inlet duct 150 is provided to guide the air to the air inlets 144 near the centre of the rotors (or at least at the inner radial portions of the impellor blades 140). As air is drawn in through the air inlet duct 150 (as shown by the dotted arrows), and drawn through the air channels by the low pressure created at the air inlet (as described above), the air is heated by transfer of the heat from the rotor, and then exits the air channels and passes out of the machine cover 148a through the air outlet 152. This air may be guided further away from the machine, or may be recirculated back into the air inlet duct once it has been cooled (described below).

Figure 9:
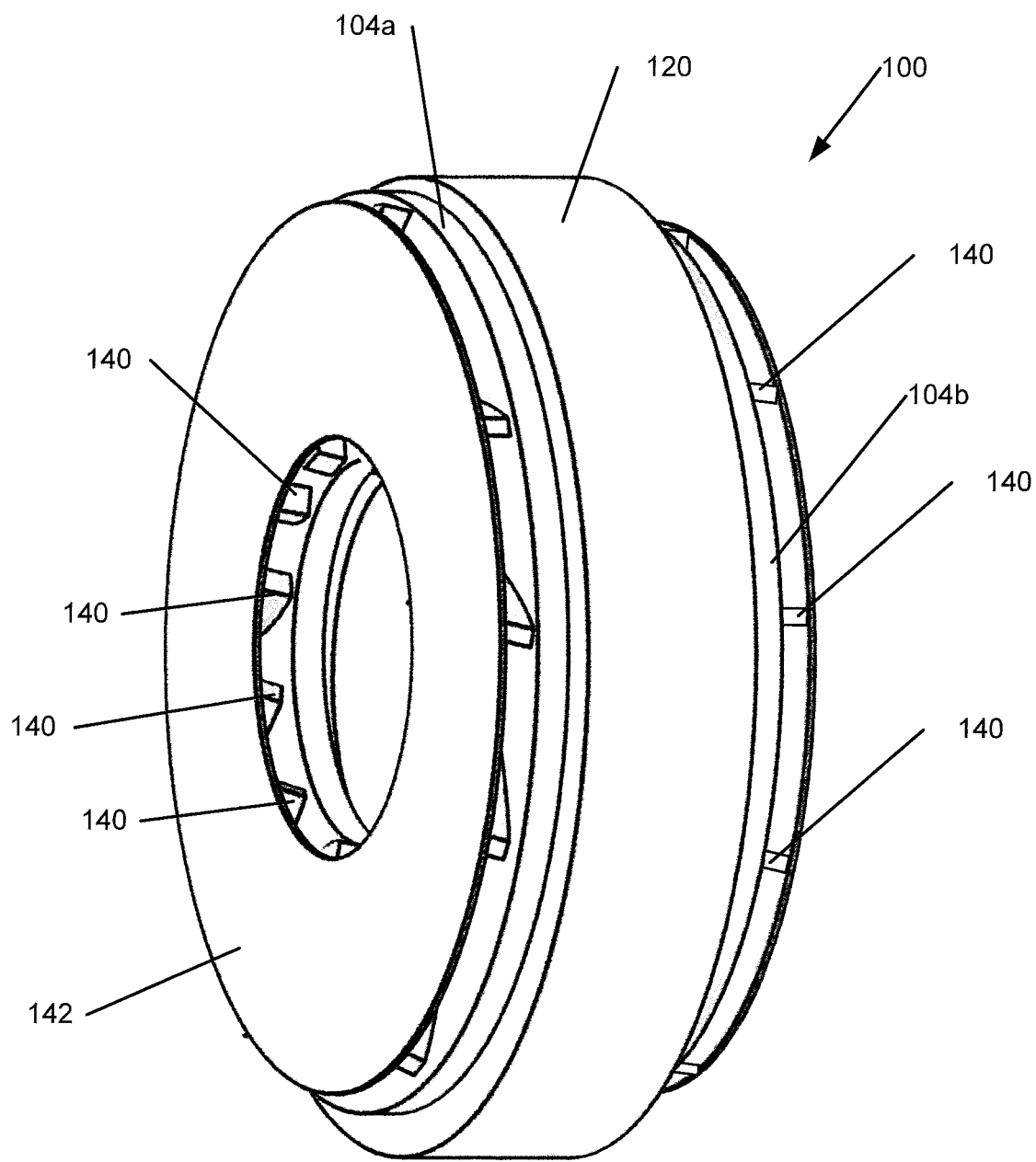
FIG. 9 shows a version of the machine comprising two rotors, each having impellor blades and impellor blade covers.
Figure 10:
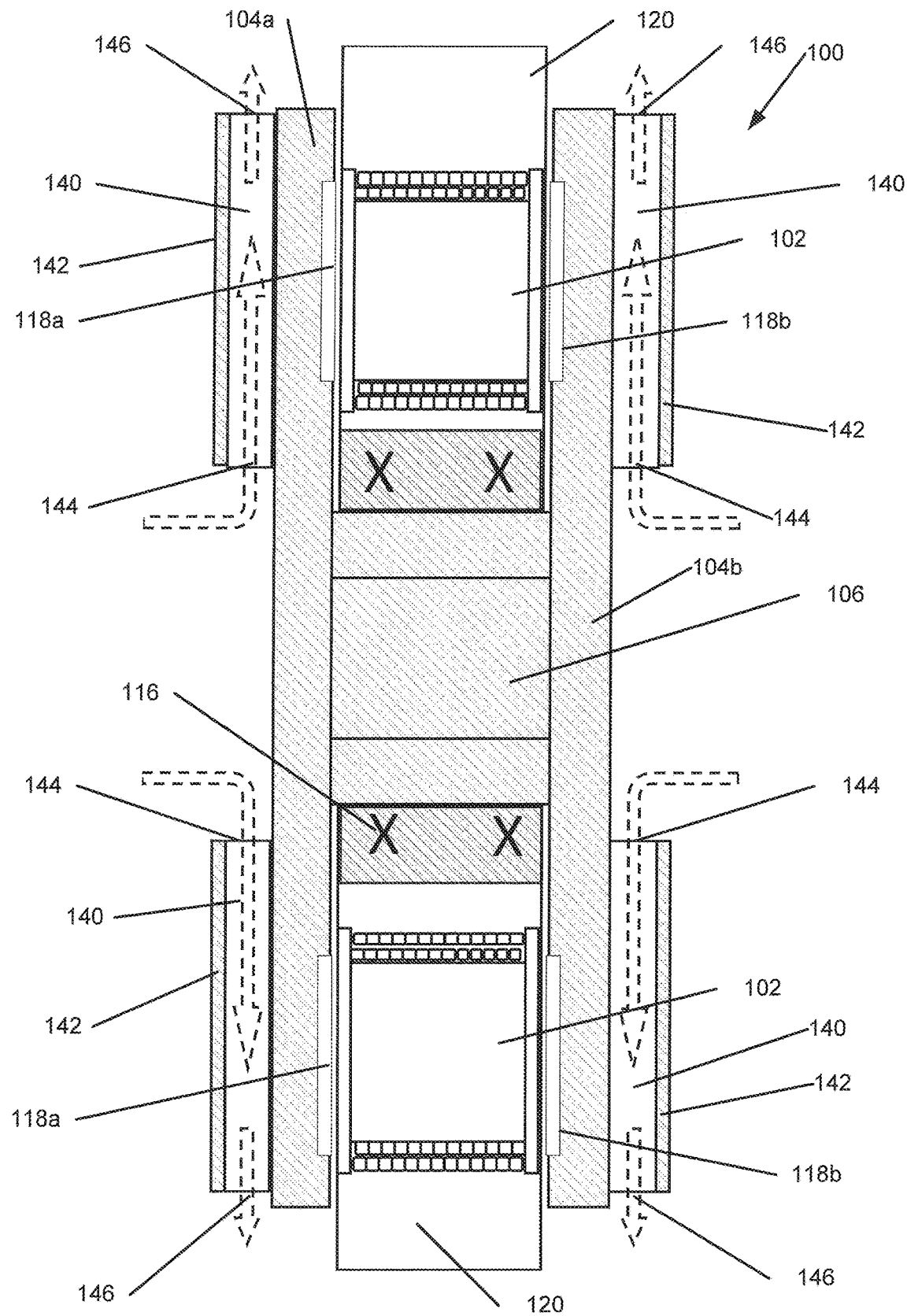
FIG. 10 shows a cut-through view of the machine of FIG. 9.
Figure 11:
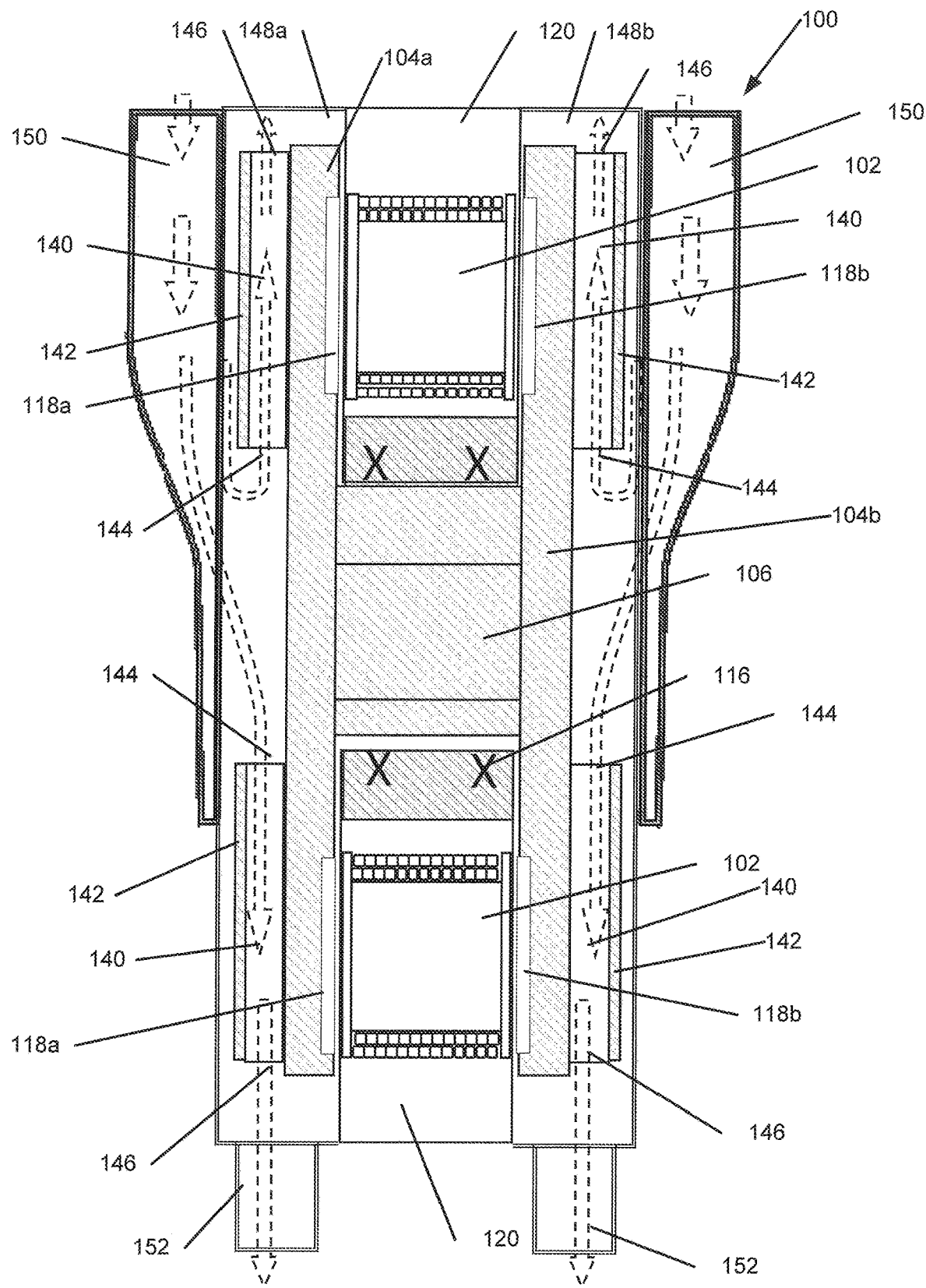
FIG. 11 shows the machine of FIG. 10 with a machine housing.

FIGS. 9 to 11 show a version of the machine where each of the first 104a and second 104b rotors comprise impellor blades 140 and impellor blade covers 142. Operation of this version of the machine is the same as that of the machine disclosed in relation to FIGS. 4 to 8. However, in this instance, since both rotors 104a,b are cooled by movement of the air through the corresponding air channels on the first and second rotors, there is no need to rely on heat conduction through the hub 106 to effect cooling of the other rotor.

Again, inlet ducting 150 and outlet ducting 152 may be provided in the machine cover 148a,b, and works in the same way as described in relation to FIGS. 7 and 8.

The impellor blades may take up any suitable configuration in order to move air between the air inlet and outlet when the rotor is moving. Various configurations are possible where the impellor blades are configured to be most efficient when the rotor is rotated in one direction, for example clockwise, or in the opposite direction, for example anti-clockwise. In some configurations, impellor blade structures may be configured to work when the rotor is rotated in either direction, which is useful when it is expected that the machine will be run in both directions, ensuring that cooling occurs when the machine is run in either direction.

In the situation when there are first and second rotors, and both rotors comprise impellor blades, the first set of impellor blades on the first rotor and the second set of impellor blades on the second rotor may be configured as uni-directional blades (i.e. they work most efficiently when rotated in one direction). For example, the first set of impellor blades may be configured as uni-direction blades operating most efficiently in one direction, and the second set of impellor blades may be configured as uni-direction blades operating most efficiently in the opposite direction. In which case, when the machine is run in one direction, both first and second sets of impellor blades work most efficiently (since both rotors rotate in unison, one rotor is rotating clockwise, whilst the other is rotating anti-clockwise). When the machine is run in the opposite direction, both sets of impellor blades would work less efficiently.

In an alternative arrangement, the first set of impellor blades may be configured as uni-direction blades operating most efficiently in one direction, and the second set of impellor blades may be configured as uni-direction blades operating most efficiently in the same direction. In which case, when the machine is run in one direction, the first set of impellor blades would work most efficiently, and when the machine is run in the opposite direction, the second set of impellor blades would work most efficiently (since both rotors rotate in unison, one rotor is rotating clockwise, whilst the other is rotating anti-clockwise). When arranged like this, cooling of the rotor having the less optimally arranged impellor blades (for that direction of rotation) would be cooled via heat transfer between the connected rotors.

In any of the machines described herein, the impellor cover may provide additional rigidity to the rotor. However, the impellor cover may act as a carrier for a rotary position sensor trigger (i.e. a copper trace which must be backed by a ferrous material in order that the position of the rotor may be sensed). The impellor cover may be separate or may be integral with the rotor disc and impellor blades e.g. in a single casting.

When the impellor cover acts as a carrier for a rotary position sensor trigger, this also serves to simplify rotor manufacture because impellor cover discs can be made with sensor trigger copper traces independent of the more complex rotor back-iron assembly.

Figure 12:
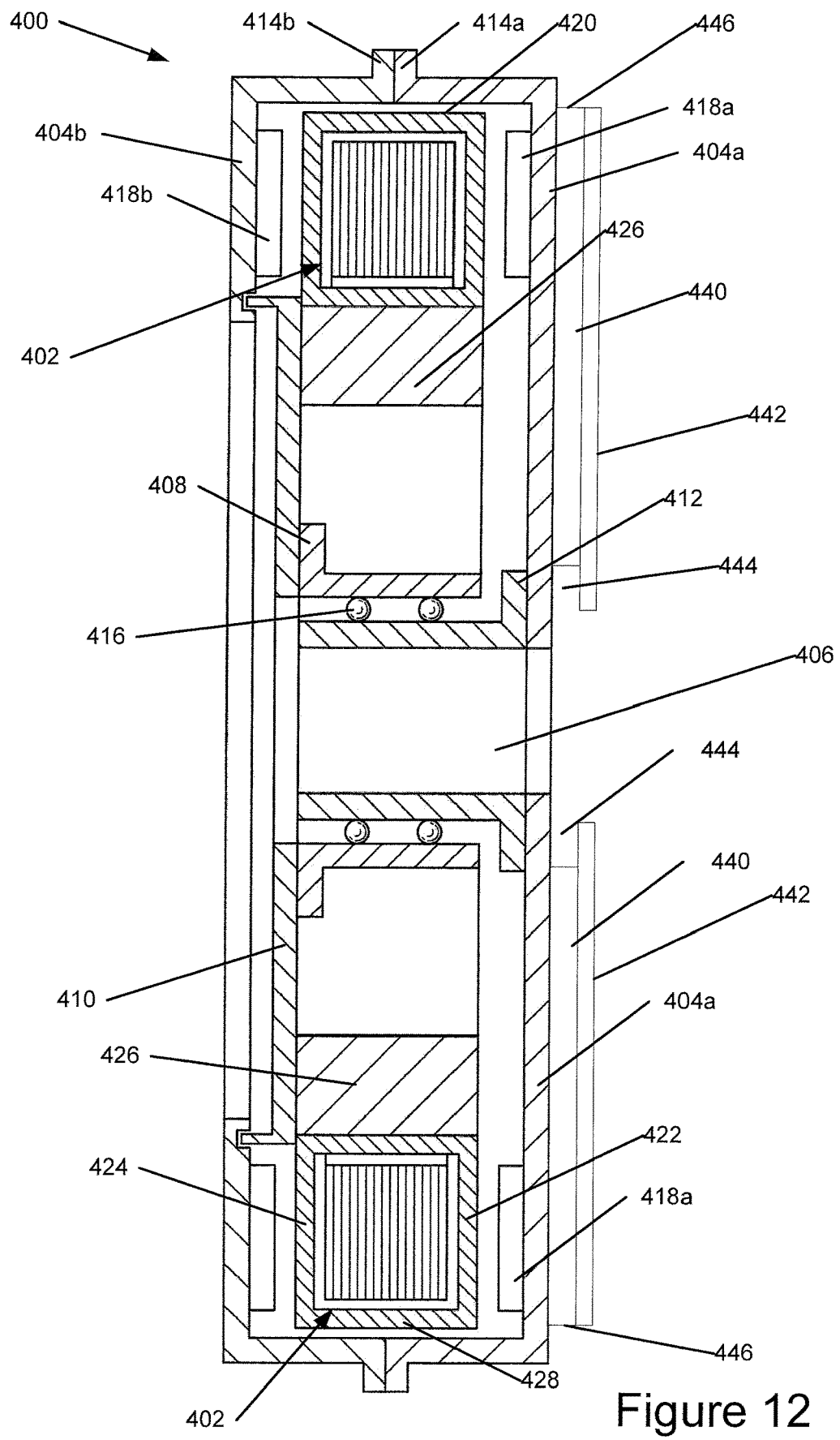
FIG. 12 shows a cut-through view of an alternative machine according to the present invention.
Figure 13:
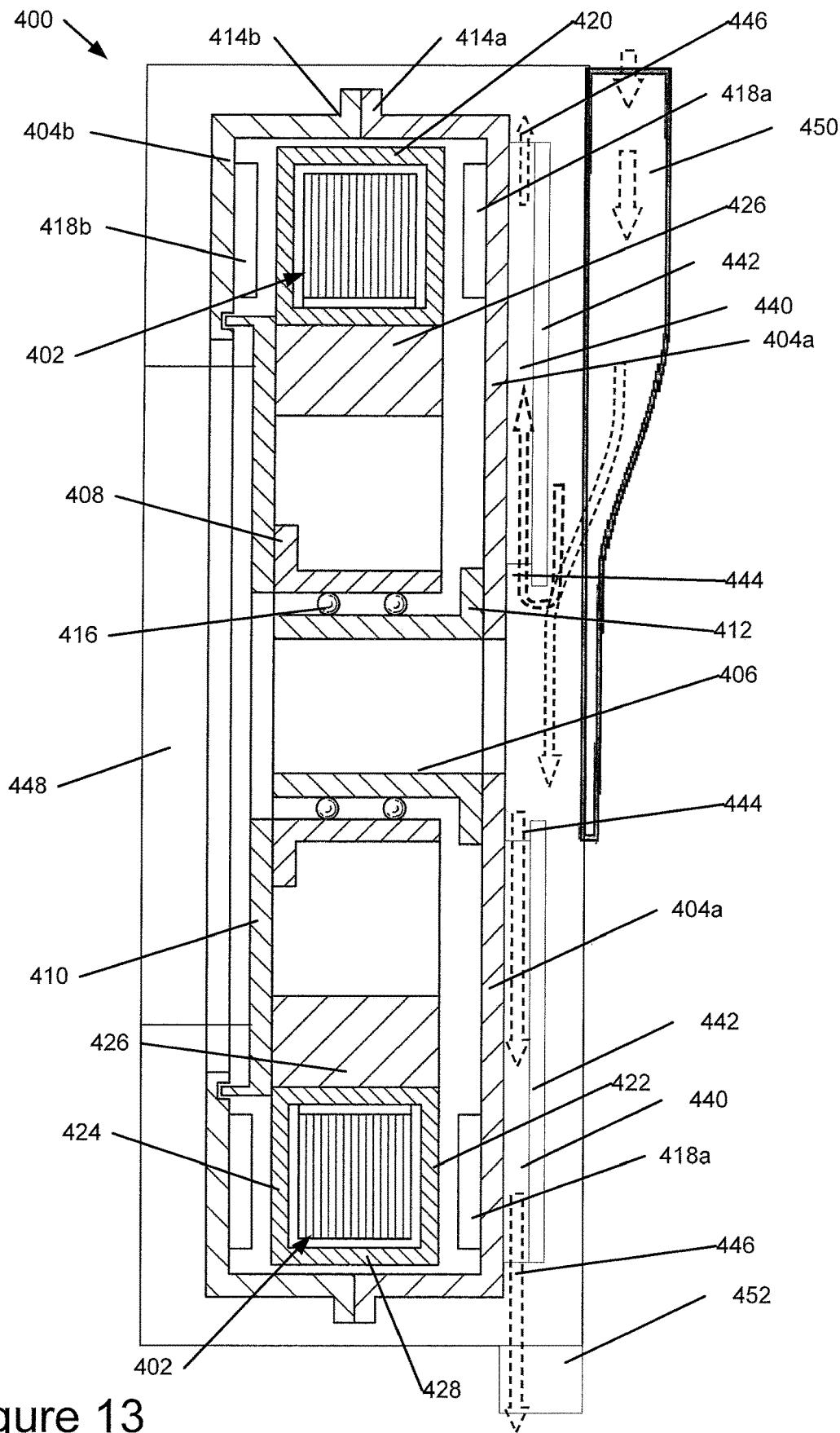
FIG. 13 shows a cut-through view of the machine of FIG. 12 with a machine housing.
Figure 14:
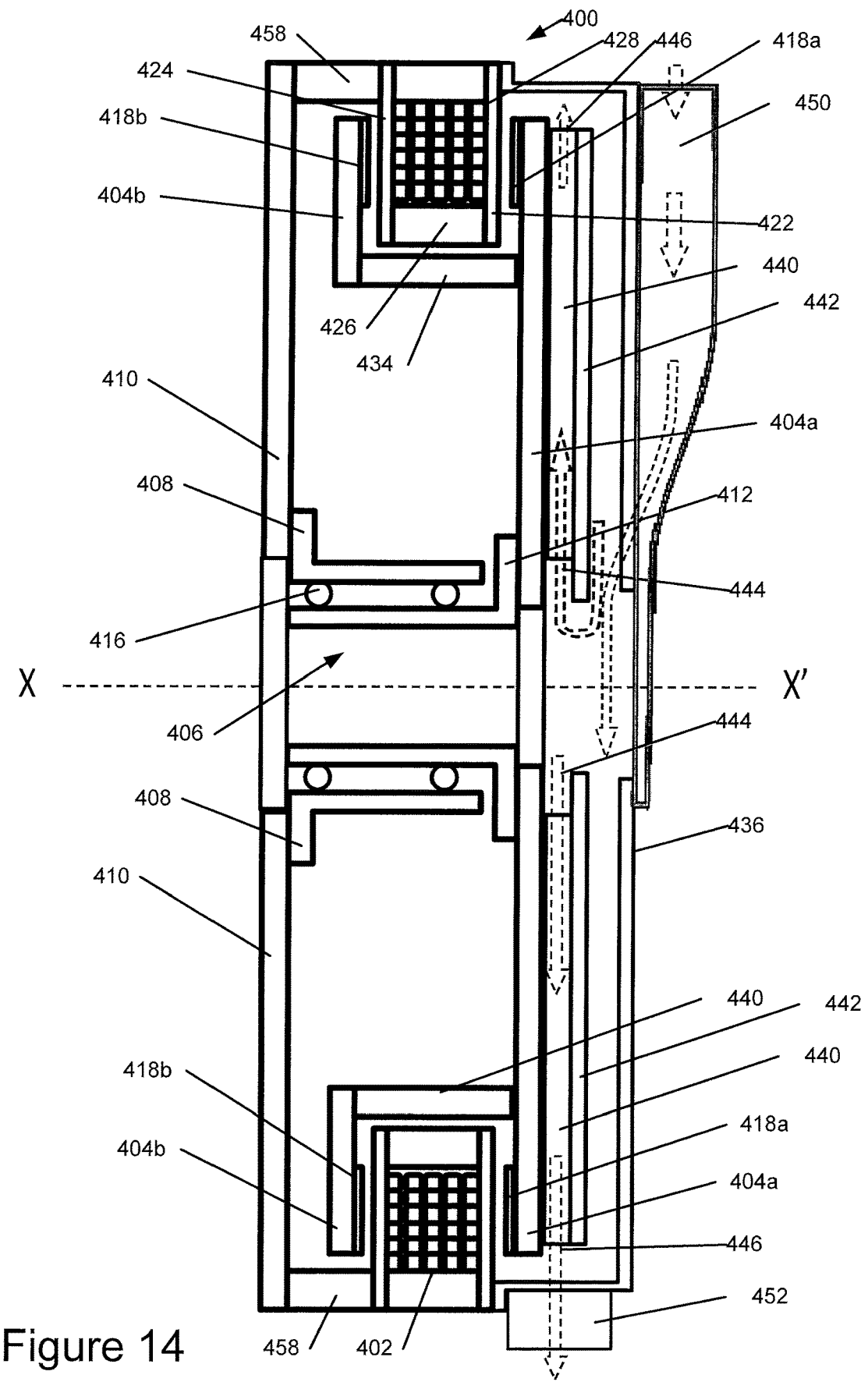
FIG. 14 shows a cut-through view of an alternative machine according to the present invention.

Referring now to FIGS. 12 to 14, which show various views of an alternative YASA machine 400, which has rotors that couple at an external periphery of the rotor, rather than via the hub as with the machine discussed in relation to FIGS. 4 to 11. The machine 400 comprises a stator 402 and a rotor 404a, b. The rotor has a cupped design, that is the stator 402 is cupped within cup-shaped rotors 404a,b which extend around the sides and over the stator 402.

A hub assembly 406 is provided to mount the stator and rotor relative to each other. The hub assembly 406 comprises a rotating hub and a mount separated by a bearing 416, so that the hub can rotate relative to the mount. The rotating hub is provided with a hub flange 412 and the mount comprising a mount flange 408, each of the flanges being spaced axially apart from one another.

The stator 402 is mounted to the hub assembly 406 via the mount flange 408. In the embodiments shown, the stator 402 mounts on the hub assembly mount flange 408 via a bulkhead 410. The bulkhead 410 or mount flange 408 may be used to mount the machine to other structures.

The first rotor 404a mounts on the hub assembly via a hub flange 412 typically using bolts (not shown). The second rotor 404b mounts only to the first rotor 404a via a plurality of rotor flanges 414a,b along the outer axial rim of the first rotor 404a. The two rotors 404a,b form a U-shaped enclosure extending either side of the stator 402 and rotate external to the stator about the axis of the machine. As can be seen, the second rotor is an annulus that is not mounted on its inner periphery. Instead, its inner periphery rotates over and relative to the stator and bulkhead on that side of the machine.

The rotors 404a,b have radial walls mounting a set of permanent magnets 418a,b. Rotor 404a provides a drive input/output, in the case of a generator/motor respectively, but for simplicity this is not shown in the figures.

Thus the machine is effectively a dual rotor machine where only one of the rotors 404a is mounted on the hub assembly 406 within the stator, and the second rotor 404b is mounted only to the first rotor 404a.

The stator 402 has a housing 420 comprising first and second radial walls 422,424 and generally cylindrical inner and outer walls 426,428, defining a chamber within which coolant may circulate. The housing encloses a set of stator coils; these and their electrical connections are not shown for simplicity. The coils are wound around pole pieces (not shown).

The inner surface of the second rotor 404b (that is the surface facing the stator 402) is provided with a U-shaped cup 430. This U-shaped cup 430 interacts with a correspondingly shaped feature 432 on the bulkhead 410 to create a labyrinth seal between the rotor 404b and stator 402. In the figures, the bulkhead 410 comprises a circular ridge 432 extending from the bulkhead and facing toward the rotor 404b. The ridge sits within the U-shaped cup 430 to provide the labyrinth seal. Such a seal protects the magnetic air gap from ingress of particulate matter and incident liquid.

Typically double rotor single stator axial flux motors, which for reasons of torque output have small magnetic and physical air gaps, rely on massive rotor back irons to provide rotor stiffness to overcome substantial attractive forces that exist between permanent magnets distributed in a clockwise fashion borne by the rotor and stator pole-piece armatures. Bearings also need be stiff, that is with zero axial movement that would allow rotors to move towards the stator and thereby risk touching of rotor to the stator.

Massive iron structures are able to provide stiffness, but also increase the mass of motors so as to dilute torque and power density. Whereas for stationary land based applications massive rotors are tolerant of higher mass, moving land based and airborne motors are sensitive to increased mass and efforts to reduce this provide considerable fuel/energy savings.

Using a wheel hub assembly as described above provides a benefit of bearing stiffness.

Whereas the wheel hub assembly provides a stiff bearing structure there is normally only one flange to support a wheel and another to attach to an automobile suspension/chassis. The wheel hub assembly and flange arrangement described above is therefore not typical of how double rotor single stator axial flux motors are assembled because to provide stiffness of structure both rotors are usually separately mounted to a bearing on either side of a stator.

Nevertheless a wheel hub assembly 406 with only one rotating hub flange 412 has been advantageously used in combination with a cupped shaped rotor 404a which is attached to the rotating hub flange 412, the cupped shaped rotor 404a partially enclosing the stator 402.

With a cupped shaped rotor 404a,b though attractive magnetic forces are high they are also balanced on either side of the stator 402. Out-of-balance attractive force are kept low by maintaining equal air-gaps between stator 402 and rotors 404a,b and the out-of-balance forces therefore do not present undue stress to the hub assembly structure (in particular the bearings) and particularly to the supporting rotor disk.

The cupped shaped rotor 404a,b is inherently a stiff structure. Stiffness in the cupped rotor is valuable in resisting magnetic attraction of either rotor to the stator which attraction typically produces coning of otherwise non-cupped, free standing rotors. Increased stiffness is particularly true for the hub assembly 406 supported rotor side 404a which is supported by the hub assembly 406 at its inner diameter and by an axial circumferential ring at its outer diameter, which circumferential ring links to the second rotor 404b and provides the inherently stiff cup structure.

The second rotor 404b gains no such resistance to coning because it is supported only on its outer periphery.

A second smaller cup structure 430 situated at the inner diameter of the second rotor 404b, surprisingly and advantageously provides increased stiffness to the second rotor 404b which resists coning of the inner periphery rim towards the stator 402 and is caused to engage with an axial protruding ridge 432 thereby leading to a labyrinth which effectively seals the rotor cavity with the narrow air gaps from ingress of particulates and liquid spray.

The whole rotor 404 because it is external and is effectively sealed against adventitious ingress of particulates and liquid spray can remain open to the atmosphere requiring no other protection and so can gain advantage of air cooling by virtue of its rotation.

However in the instance where the entire machine 400 or rotor 404 is enclosed and so cannot take advantage of open air cooling, or in the instance where particularly high torque or power is demanded over extended periods the present invention is applicable as follows. A plurality of impellor blades 440 are disposed on a surface of the first rotor 404a, opposite to the surface facing the stator 402. The impellor blades project from the surface of the rotor 404a axially, and extend generally radially with respect to the axis of rotation of the rotor. The impellor blades are covered by an impellor cover 442, which may be in the shape of an annulus.

As with the previously described machine, the placement of the impellor cover 442 over the impellor blades 440 creates a plurality of air channels, each located between adjacent pairs of rotor blades. Each air channel has an air inlet 444 located at an inner radial end of the impellor blades 440, and each air channel has an air outlet 446 at an outer radial extremity of the impellor blades 440. As the rotor 404a rotates, the impellor blades 440 are configured to move air through the plurality of air channels from the air inlet 444 to the air outlet 446. As the air passes over the back surface of the rotor (which forms part of the air channels), heat is transferred from the rotor 404a surface into the air, which exits through the air outlet 446 and thus cools the rotor.

The air flow caused by rotation of the rotor 404a and impellor blades 440 generates a pressure differential along the air channel. A lower air pressure is created at the air inlet, which causes more air to be drawn into and through the air channel.

Again, the impellor blades 440 and impellor cover 442 form an enclosed impellor design, rather than an open impellor design. A closed impellor design provides more consistent fan performance from machine to machine, since the dimensions of air channels are fixed, and are not reliant on tolerances of several components in the axial dimension (e.g. the axial distance between the impellor blades and a machine cover, which can vary depending on the tolerancing of various components in that axis).

As above, the impellor blades 440 and/or impellor cover 442 are preferably made of metal. Since they have relatively large surface areas (they may cover the majority of the surface of the back of the rotor 404a), they provide a great means for heat removal. The blades 440 and cover 442 also provide additional rigidity to the rotor 404*a*.

Furthermore, this closed fan design generates turbulent flow, since there is an increase in air velocity for a given pressure differential, which increases the likelihood of breaching the Reynolds number of 2000. Turbulent air greatly improves the efficiency of the heat transfer between the rotor surface and the air passing through the air channels. It also may overcome back-pressure of the air inlet system, which may include an inlet filter and ducting bringing "cool" air in from beyond the immediate environment.

Since the impellor blades are only provided on the first rotor 404*a*, the second rotor 404*b* is cooled by thermal transfer through connection between the first and second rotors 404*a,b*.

By providing the impellors 440 and impellor cover 442, effective cooling is provided to the rotors, which enables the rotor 404*a,b* to work harder for longer: heat generated by eddy-currents in the magnets and back-iron is transferred to the air meaning the rotor runs cooler for a given speed/torque requirement.

FIG. 13 shows the machine of FIG. 12 with a machine housing 448, an inlet duct 450 and an outlet duct 452. The air inlet duct 450 provides air to the air inlet 444, and the air outlet 452 receives output air from the air outlet 446. The operation of this version of the machine is the same as that of FIG. 12, however in this instance, the rotors 404*a,b* are covered by machine cover 448, which protect the rotors from the sometimes harsh external environment, and also protect users from open rotating rotors.

In this case, an inlet duct 450 is provided to guide the air to the air inlets 444 near the centre of the rotors (or at least at the inner radial portions of the impellor blades 440).

As air is drawn in through the air inlet duct 450 (as shown by the dotted arrows), and drawn through the air channels by the low pressure created at the air inlet (as described above), the air is heated by transfer of the heat from the rotor, and then exits the air channels and passes out of the machine cover 448 through the air outlet 452. This air may be guided further away from the machine, or may be recirculated back into the air inlet duct once it has been cooled (described below).

FIG. 14 shows an alternative machine having a different structure to the machine shown in FIGS. 12 and 13, but with common components. Like components are numbered similarly as above.

In the alternative machine of FIG. 14, instead of the second rotor 404*b* being mounted only to the first rotor 404*a* along its outer axial rim, the second rotor 404*b* is mounted only to the first rotor 404*a* along an internal portion located radially inwardly from its outer axial rim. In the alternative machine, the first and second rotors form a U-shaped cupped enclosure extending either side of an internal radial periphery of the stator (instead of an external radial periphery of the stator as in the case of FIGS. 12 and 13).

As above, a hub assembly 406 is provided to mount the stator and rotor relative to each other. The hub assembly 406 comprises a rotating hub and a mount separated by a bearing 416, so that the hub can rotate relative to the mount. The rotating hub is provided with a hub flange 412 and the mount comprising a mount flange 408, each of the flanges being spaced axially apart from one another.

The stator 402 is mounted to the hub assembly 406 via the mount flange 408. In the embodiments shown, the stator 402 mounts on the hub assembly mount flange 408 via a bulkhead 410. The bulkhead 410 or mount flange 408 may be used to mount the machine to other structures. In this alternative machine, an additional mounting portion 458 is used between the stator and the bulkhead 410 in order to provide sufficient space between the bulkhead and stator in order to accommodate the second rotor 404*b*.

The first rotor 404*a* mounts on the hub assembly via a hub flange 412 typically using bolts (not shown). In this case, the first rotor 404*a* is shown as a flat disk, although other structures may be possible, for example a cupped rotor structure. The second rotor 404*b* mounts only to the first rotor 404*a* via a mounting portion 434 along an internal portion located radially inwardly from its outer axial rim of the first rotor 404*a*. The two rotors 404*a,b* form a U-shaped cupped enclosure extending either side of the stator 402 and rotate external to the stator about the axis of the machine. In this alternative machine, the U-shaped cupped rotors extend either side of an internal radial periphery of the stator 402.

The second rotor 404*b* may be an annulus that is mounted on its inner periphery via a mounting portion 434. Alternatively, the second rotor 404*b* may be an L-shaped rotor (that is, the mounting portion is integral with the annulus described above). As such, its outer periphery rotates over and relative to the stator between the stator and the bulkhead on that side of the machine.

The rotors 404*a,b* have radial walls mounting a set of permanent magnets 418*a,b*. Rotor 404*a* provides a drive input/output, in the case of a generator/motor respectively, but for simplicity this is not shown in the figure.

Thus again the machine is effectively a dual rotor machine where only one of the rotors 404*a* is mounted on the hub assembly 406 within the stator, and the second rotor 404*b* is mounted only to the first rotor 404*a*.

There are many benefits of this alternative machine. For example, the magnetics are separate from the structural supporting elements and bearing so that the rotor structure 404*a* may be in two pieces, each of which may contain a ferromagnetic back-iron and a set of permanent magnets, with the inner periphery structural element easily modified, for example, to change the diameter of the bearing hub without altering the magnetics.

So too the mounting plate 410 may be changed without affecting the stator 402.

In FIG. 14, the machine is exposed to the environment on the first rotor 404*a* side of the machine. In FIG. 14, the structural mounting of the stator 402 to the hub assembly mount flange 408 encloses the second rotor side of the machine.

A machine cover 436 may be mounted to the stator 402 to enclose the first rotor 404*a* side of the machine. Alternatively, the cover 436 may be attached stator radial housing face.

The cover shown in FIG. 14 comprises an axle aperture. What is not shown is a lip seal which might be used if an axle is present. However, the cover 436 could equally have no axle aperture with input/output from the machine being taken through bulkhead 410.

In addition to the above benefits of this alternative structure, the physical air gap between stator and rotor may be adjusted by shim(s) on the rotating flange 412 or the stationary flange 408. The total physical air gap may remain constant, but the balance of this may be adjusted by shims between 412 and 404*a*, or between 408 and 410.

A plurality of impellor blades 440 are disposed on a surface of the first rotor 404*a*, opposite to the surface facing the stator 402. The impellor blades project from the surface of the rotor 404*a* axially, and extend generally radially with respect to the axis of rotation of the rotor. The impellor blades are covered by an impellor cover 442, which may be in the shape of an annulus.

As with the previously described machine, the placement of the impellor cover 442 over the impellor blades 440 creates a plurality of air channels, each located between adjacent pairs of rotor blades. Each air channel has an air inlet 444 located at an inner radial end of the impellor blades 440, and each air channel has an air outlet 446 at an outer radial extremity of the impellor blades 440. As the rotor 404a rotates, the impellor blades 440 are configured to move air through the plurality of air channels from the air inlet 444 to the air outlet 446. As the air passes over the back surface of the rotor (which forms part of the air channels), heat is transferred from the rotor 404a surface into the air, which exits through the air outlet 446 and thus cools the rotor.

The air flow caused by rotation of the rotor 404a and impellor blades 440 generates a pressure differential along the air channel. A lower air pressure is created at the air inlet, which causes more air to be drawn into and through the air channel.

Again, the impellor blades 440 and impellor cover 442 form an enclosed impellor design, rather than an open impellor design. A closed impellor design provides more consistent fan performance from machine to machine, since the dimensions of air channels are fixed, and are not reliant on tolerances of several components in the axial dimension (e.g. the axial distance between the impellor blades and a machine cover, which can vary depending on the tolerancing of various components in that axis).

As above, the impellor blades 440 and/or impellor cover 442 are preferably made of metal. Since they have relatively large surface areas (they may cover the majority of the surface of the back of the rotor 404a), they provide a great means for heat removal. The blades 440 and cover 442 also provide additional rigidity to the rotor 404a.

Furthermore, this closed fan design generates turbulent flow, since there is an increase in air velocity for a given pressure differential, which increases the likelihood of breaching the Reynolds number of 2000. Turbulent air greatly improves the efficiency of the heat transfer between the rotor surface and the air passing through the air channels. It also may overcome back-pressure of the air inlet system, which may include an inlet filter and ducting bringing "cool" air in from beyond the immediate environment.

Since the impellor blades are only provided on the first rotor 404a, the second rotor 404b is cooled by thermal transfer through connection between the first and second rotors 404a,b.

By providing the impellors 440 and impellor cover 442, effective cooling is provided to the rotors, which enables the rotor 404a,b to work harder for longer: heat generated by eddy-currents in the magnets and back-iron is transferred to the air meaning the rotor runs cooler for a given speed/torque requirement.

The machine housing 436 may be provided with an inlet duct 450 and an outlet duct 452. The air inlet duct 450 provides air to the air inlet 444, and the outlet duct 452 receives output air from the air outlet 446.

The inlet duct 450 is provided to guide the air to the air inlets 444 near the centre of the rotors (or at least at the inner radial portions of the impellor blades 440). As air is drawn in through the air inlet duct 450 (as shown by the dotted arrows), and drawn through the air channels by the low pressure created at the air inlet (as described above), the air is heated by transfer of the heat from the rotor, and then exits the air channels and passes out of the machine cover 436 through the air outlet duct 452. This air may be guided further away from the machine, or may be recirculated back into the air inlet duct once it has been cooled (described below).

Figure 15:
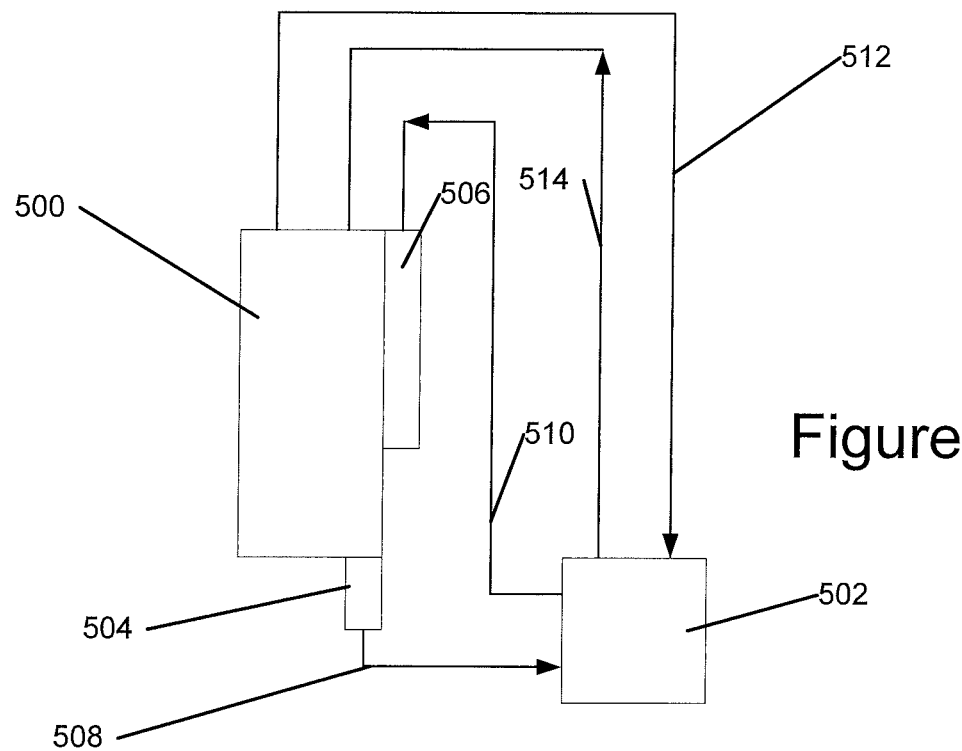
FIG. 15 shows a simplified cooling circuit having a heat exchanger.
Figure 16:
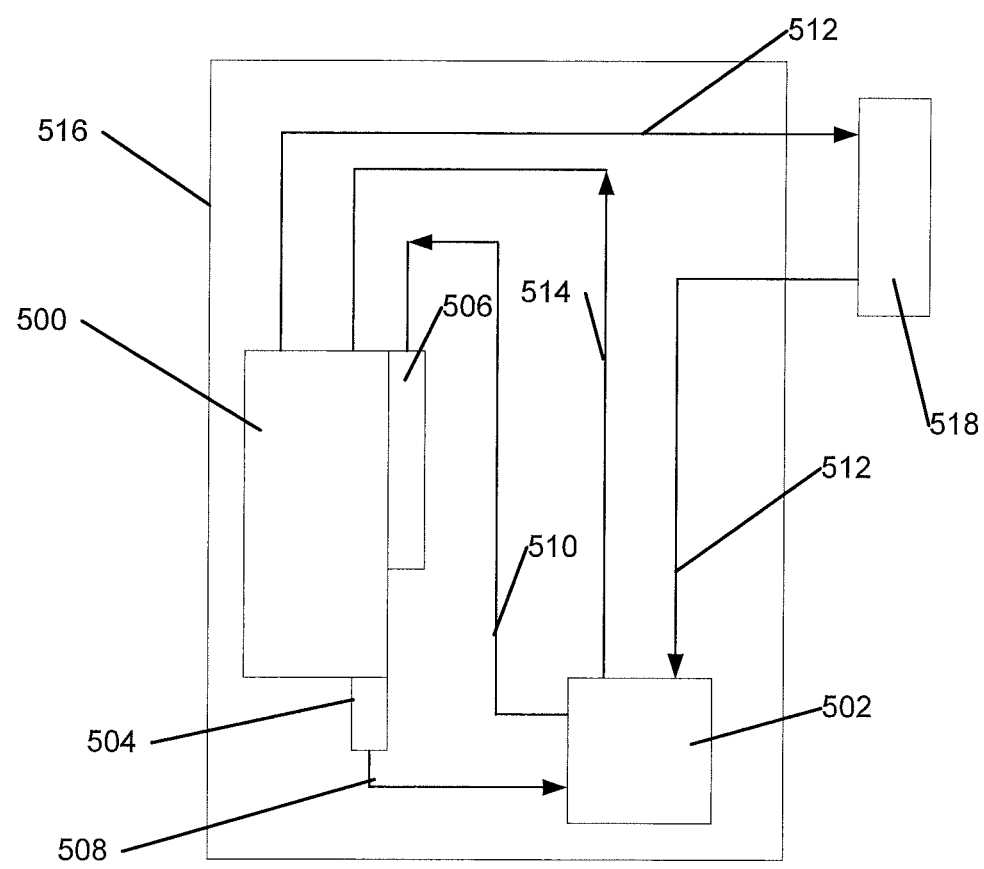
FIG. 16 shows a cooling circuit having a radiator.
Figure 17:
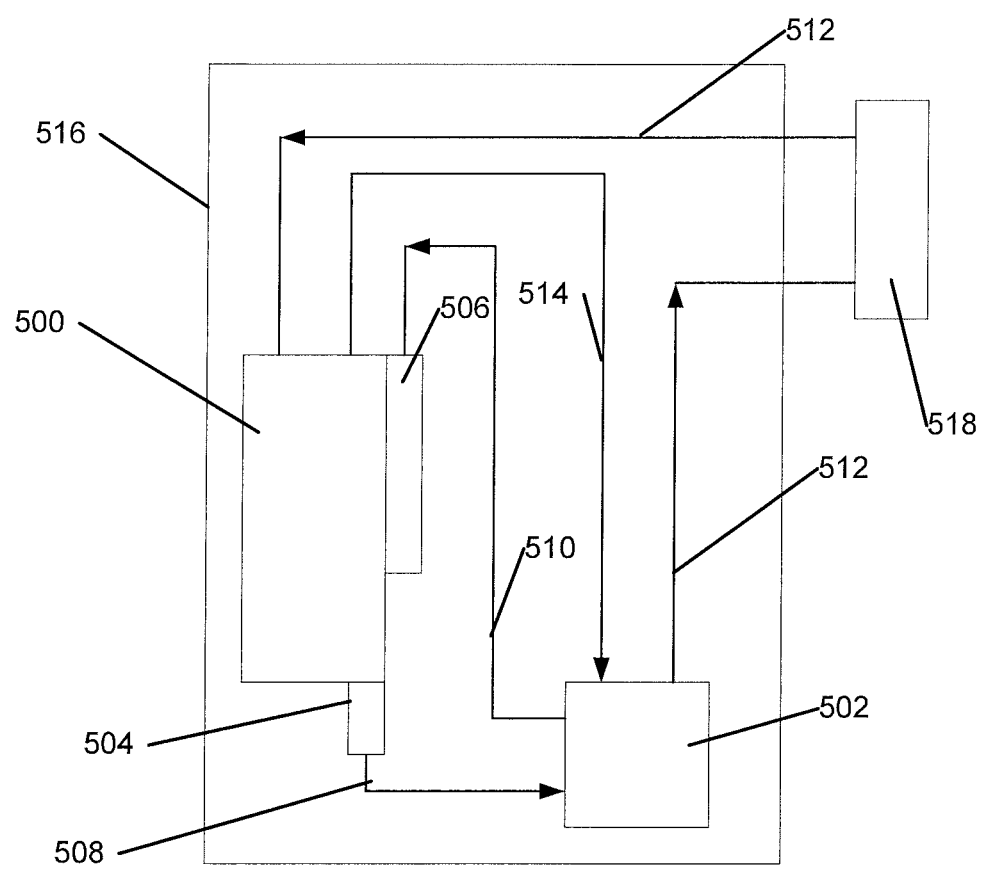
FIG. 17 shows an alternative cooling circuit of FIG. 16.

FIGS. 15 to 17 show various configurations of a machine arrangement in which the air output from the machine is recirculated from the output back into the input (after cooling via a heat exchanger, which passes the heat from the output air into the stator oil coolant system). Such an arrangement enables a motor to be sealed from the local environment and so make it more suitable for harsh (e.g. marine and explosive) environments.

FIG. 15 shows a basic arrangement, where a machine 500 (which could be any of the machines 100, 400 described above) has an air outlet 504 that feeds output air (that has been heated by the heat of the rotors of the machine 500) into a heat exchanger 502 via air ducting 508. The resulting cooled air output from the heat exchanger 502 is then fed back into the machine via air ducting 510 and the air inlet 506. Heat is transferred from the air cooling circuit into the stator cooling circuit (where the stator is filled with a cooling medium such as an oil, and circulated between the coils comprising the stator) via the heat exchanger 502 and the stator coolant circuit 512, 514.

Since the stator coolant circuit is more efficient, this often runs at a lower temperature than the output air that has cooled the rotors. As such, this temperature differential enables heat to be transferred into the stator coolant circuit and taken away from the rotors before the resulting cooler air is fed back into the air inlet.

In practice, a means of extracting the heat from the stator coolant system is required to prevent thermal runaway of the stator cooling system. FIGS. 16 and 17 show alternative versions of such a system.

In FIGS. 16 and 17, the system of FIG. 15 is provided with a radiator 518, which enables heat to be extracted from the stator coolant system. The stator coolant circuit 512, 514 is coupled to the radiator either on the input of the heat exchanger 502 (FIG. 16) or on the output of the heat exchanger (FIG. 17) to extract heat from the stator coolant system. The radiator 518 may be placed some distance away from the machine 500 and heat exchanger 502, so that resultant heat from the radiator is not fed back into the system. The machine 500 and heat exchanger 502 may also be placed in an enclosure 516 and the radiator 518 placed outside of the enclosure 516.

Whilst we have described the above machines with reference to the machines being motors, we also envisage that the machines may be run as generators to generate electricity from the rotation of the rotor relative to the stator.

In order to couple rotational power into and out of the machines, a drive shaft or axle may be coupled to the first rotor 104a, 404a or the rotating hub of the hub assembly 406. In the version shown in FIGS. 4 to 11, a drive shaft or axle may be coupled to the second rotor 104b. Though not shown in the figures the internal surface of the hub assembly may have a splined surface. This may be used to couple power into and out of the machine via a shaft. However, the splined surface is not necessary, as the shaft may be coupled to the hub flange or a suitable surface of the rotor.

In the above described examples where there are two rotors, but only impellor blades provided on the first rotor (for example FIGS. 4 to 8, and 12 to 14), we have described that cooling of the second rotor is effected by heat conduction either through the hub joining the rotors (FIGS. 4 to 8) or through the connection between the first and second rotors (FIGS. 12 to 14).

Additional cooling may be provided to the heat conduction between the second and first rotors discussed in relation to FIGS. 4 to 8 and 12 to 14 by feeding the output air from the air outlet of the impellor blade air channels on the first rotor to flow over the second rotor. Two main schemes are envisaged: (i) where the second rotor is sealed to the environment outside the machine housing; and (ii) where there is an air outlet duct in the machine housing on the second side of the machine with the second rotor.

In the first scheme, as the first and second rotors rotate in unison, air is drawn in through the air inlet duct into the air inlets, through the plurality of air channels and out from the plurality of air outlets. This output air is then fed into the second side of the machine to come into contact with the second rotor. This may be achieved using ducting or air channels to direct the air flow from the first rotor to the second rotor via the hub or central region. Since air will be thrown radially outward due to the rotation of the second rotor, it is preferable that the air output from the first rotor is channelled into a central, or inner radial, region of the second rotor. In this scheme, the air outlet duct is in the machine housing on same side of the machine as the first rotor, and either all or a portion of the air output from the first rotor is fed into the second side of the machine to come into contact with the second rotor.

In this first scheme, the additional cooling is provided by the air from the first side of the machine contacting the second rotor and the heat being transferred into the air, which gets pushed around the cavity between the second rotor and machine housing. In this scheme, the first rotor acts as a pump to pump some or all of the output air from the first side of the machine into the second side of the machine to come into contact with the second rotor.

In the second scheme, as the first and second rotors rotate in unison, air is drawn in through the air inlet duct into the air inlets, through the plurality of air channels and out from the plurality of air outlets. This output air is then fed into the second side of the machine to come into contact with the second rotor. This may be achieved using ducting or air channels to direct the air flow from the first rotor to the second rotor via the hub or central region. Since air will be thrown radially outward due to the rotation of the second rotor, it is preferable that the air is channeled from the first rotor into a central, or inner radial, region of the second rotor. In this scheme, the air outlet duct is in the machine housing on the same side of the machine as the second rotor, so all of the air output from the first rotor is fed into the second side of the machine to come into contact with the second rotor before it leaves the machine housing via the air outlet duct on the second side of the machine.

In this second scheme, the additional cooling is provided by the air from the first side of the machine contacting the second rotor and the heat being transferred into the air, which gets pushed around the cavity between the second rotor and machine housing before it exits the machine cover via the outlet duct, which is on the second side of the machine. Again, the first rotor acts as a pump to pump the output air from the first side of the machine into the second side of the machine to come into contact with the second rotor, before it exits the machine housing.

As discussed above, the first and second scheme may be implemented additionally or alternatively to the heat conduction cooling mechanisms discussed in FIGS. 4 to 8 and 12 to 14.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. An axial flux machine comprising:
   a stator comprising a stator housing enclosing a plurality of stator bars disposed circumferentially at intervals around an axis of the machine, each of the stator bars having a set of coils wound therearound for generating a magnetic field;
   a first rotor comprising a set of permanent magnets on a first side of the rotor facing the stator, the first rotor being mounted for rotation about the axis of the machine and relative to the stator, the first rotor being spaced apart from the stator along the axis of the machine to define an axial gap between the stator and rotor and in which magnetic flux in the machine is generally in an axial direction;
   a plurality of impellor blades projecting axially from a second side of the first rotor, and extending radially along at least a portion of the second side of the first rotor, the second side of the first rotor facing away from the stator;
   an impellor cover covering the plurality of impellor blades to define a plurality of covered air channels between each adjacent pair of impellor blades, each air channel having an air inlet at an inner radial end of the impellor blades, and each air channel having an air outlet at an outer radial extremity of the impellor blades, and
   a second rotor disposed on an opposite side of the stator to the first rotor, the second rotor comprising a set of permanent magnets on a first side of the second rotor facing the stator, the second rotor being mounted for rotation about the axis of the machine and relative to the stator, the second rotor being spaced apart from the stator along the axis of the machine to define an axial gap between the stator and second rotor and in which magnetic flux in the machine is generally in an axial direction;
   wherein the impellor blades are configured to move air through the plurality of air channels from the air inlet to the air outlet when the first rotor turns, to cool the rotor,
   wherein at least a portion of the air from the air outlets on the first rotor is directed to flow over the second rotor, and
   wherein the machine is a motor or generator.

2. An axial flux machine according to claim 1, comprising a machine housing enclosing the first rotor, the machine housing comprising an outlet duct for receiving expelled air from the air outlets and passing the expelled air out of the machine housing.

3. An axial flux machine according to claim 2, wherein the machine housing comprises an inlet duct for directing air from outside of the machine housing to the air inlets.

4. An axial flux machine according to claim 3, wherein the inlet duct comprises or is coupled to an air filter.

5. An axial flux machine according to claim 2, wherein the machine housing encloses the stator.

6. An axial flux machine according to claim 1, comprising a hub bearing assembly between the first and second rotors and stator to permit relative rotation between the first and second rotors and stator.

7. An axial flux machine according to claim 6, wherein the hub bearing assembly couples the first and second rotors together such that they are rotatable together.

8. An axial flux machine according to claim 6, wherein the first rotor is mounted to the hub bearing assembly and the second rotor is mounted only to the first rotor, the first and second rotors forming a U-shaped cupped enclosure extending either side of the stator.

9. An axial flux machine according to claim 1, comprising:
- a second plurality of impellor blades projecting axially from a second side of the second rotor, and extending radially along at least a portion of the second side of the second rotor, the second side of the second rotor facing away from the stator; and
- a second impellor cover covering the second plurality of impellor blades to define a plurality of covered air channels between each adjacent pair of impellor blades, each air channel having an air inlet at an inner radial end of the impellor blades, and each air channel having an air outlet at an outer radial extremity of the impellor blades,
- wherein the impellor blades are configured to move air through the plurality of air channels from the air inlet to the air outlet when the rotor turns, to cool the rotor.

10. An axial flux machine according to claim 1, comprising a machine housing enclosing the second rotor, the machine housing comprising a second outlet duct for receiving expelled air from the air outlets of the second plurality of impellor blades, and passing the expelled air out of the machine housing.

11. An axial flux machine according to claim 10, wherein the machine housing comprises an inlet duct for directing air from outside of the machine housing to the air inlets of the second plurality of impellor blades.

12. An axial flux machine according to claim 1, wherein the air from the air outlets is directed towards an inner radial portion of the second rotor.

13. An axial flux machine according to claim 1, wherein the impellor blades are shaped so as to move air between the air inlet and air outlet when the rotor rotates in a clockwise direction.

14. An axial flux machine according to claim 1, wherein the impellor blades are shaped so as to move air between the air inlet and air outlet when the rotor rotates in an anti-clockwise direction.

15. An axial flux machine according to claim 1, wherein the stator housing defines a chamber incorporating cooling medium in contact with the coils to cool the coils, the stator housing including a port for supply and a port for drainage of the cooling medium.

16. An axial flux machine according to claim 15, wherein the port for supply and port for drainage are coupled to a heat exchanger, and wherein air from the air outlet is directed through the heat exchanger such that heat is transferred from the air into the cooling medium.

17. An axial flux machine according to claim 16, wherein the air directed through the heat exchanger is directed towards the air inlet after passing through the heat exchanger.

18. An axial flux machine according to claim 15 wherein the port for supply and the port for drainage of the cooling medium form part of a cooling circuit comprising a pump and a radiator, the radiator for extracting heat from the cooling medium.

19. An axial flux machine according to claim 18, wherein the axial flux machine is located in an enclosure, and wherein the radiator is located outside of the enclosure.

20. An axial flux machine according to claim 1, wherein the impellor cover comprises an annulus.

21. An axial flux machine according to claim 1, wherein the impellor cover comprises a rotary position sensor trigger for a rotary position sensor.

* * * * *